(12) United States Patent
Huang

(10) Patent No.: US 11,385,442 B2
(45) Date of Patent: Jul. 12, 2022

(54) PHOTOGRAPHING LENS SYSTEM, IMAGING APPARATUS AND ELECTRONIC DEVICE INCLUDING SEVEN LENSES OF −+−+− OR −+−++− REFRACTIVE POWERS

(71) Applicant: LARGAN PRECISION CO., LTD., Taichung (TW)

(72) Inventor: Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 278 days.

(21) Appl. No.: 16/711,904

(22) Filed: Dec. 12, 2019

(65) Prior Publication Data
US 2020/0400921 A1   Dec. 24, 2020

(30) Foreign Application Priority Data
Jun. 18, 2019   (TW) ................................ 108121142

(51) Int. Cl.
*G02B 13/00*   (2006.01)
*G02B 9/64*   (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

| 5,200,861 A | 4/1993 | Moskovich |
| 6,191,896 B1 | 2/2001 | Itoh |
| 6,233,099 B1 | 5/2001 | Itoh |
| 8,780,464 B2 | 7/2014 | Huang |
| 9,961,244 B2 | 5/2018 | Liao et al. |
| 2016/0377839 A1 | 12/2016 | Chen et al. |
| 2018/0314036 A1 | 11/2018 | Li |
| 2019/0049698 A1 | 2/2019 | Chen |
| 2019/0101728 A1* | 4/2019 | Hsieh ........................ G02B 9/64 |

FOREIGN PATENT DOCUMENTS

| CN | 106990510 A | 7/2017 |
| CN | 108107546 A | 6/2018 |
| CN | 108873254 A | 11/2018 |
| JP | H11084242 | 3/1993 |
| JP | 2017037342 A | 2/2017 |

(Continued)

*Primary Examiner* — Wen Huang
(74) *Attorney, Agent, or Firm* — Locke Lord LLP; Tim Tingkang Xia, Esq.

(57) ABSTRACT

A photographing lens system includes seven lens elements, the seven lens elements being, in order from an object side to an image side: a first lens element, a second lens element, a third lens element, a fourth lens element, a fifth lens element, a sixth lens element, and a seventh lens element. Each of the seven lens elements has an object-side surface facing toward the object side and an image-side surface facing toward the image side. The first lens element has negative refractive power. The second lens element has negative refractive power. The image-side surface of the fourth lens element is concave in a paraxial region thereof. The image-side surface of the seventh lens element is concave in a paraxial region thereof and has at least one inflection point in an off-axis region thereof.

12 Claims, 22 Drawing Sheets

(56) References Cited

FOREIGN PATENT DOCUMENTS

| | | |
|---|---|---|
| JP | 2017102211 A | 6/2017 |
| TW | I614517 B | 2/2018 |
| TW | 201816456 A | 5/2018 |
| TW | I636295 B | 9/2018 |
| TW | I647511 B | 1/2019 |
| WO | 2018045607 A1 | 3/2018 |
| WO | 2018218889 A1 | 12/2018 |

* cited by examiner

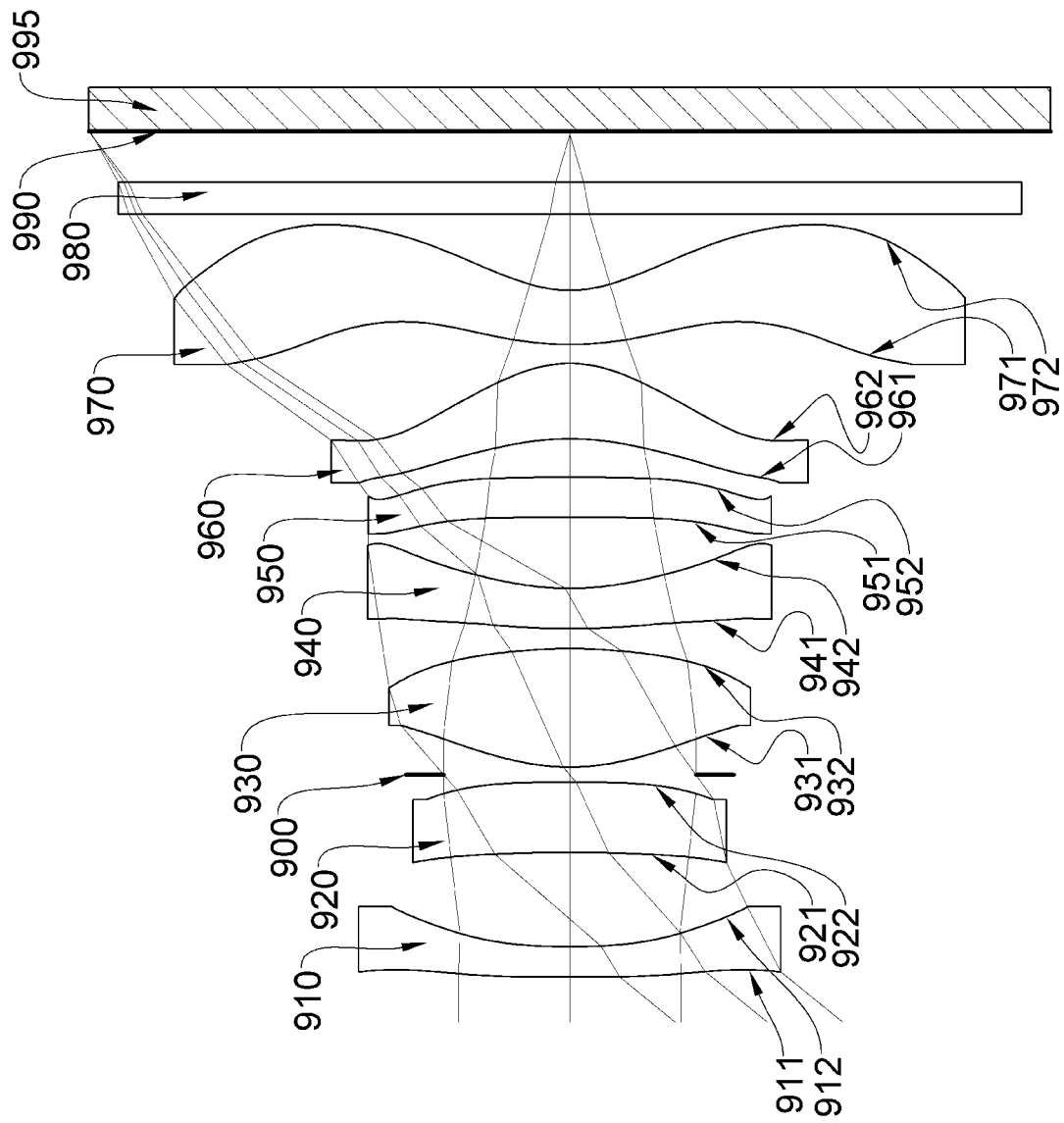

PHOTOGRAPHING LENS SYSTEM, IMAGING APPARATUS AND ELECTRONIC DEVICE INCLUDING SEVEN LENSES OF −+−−+− OR −−+−++− REFRACTIVE POWERS

RELATED APPLICATIONS

This application claims priority to Taiwan Application Serial Number 108121142, filed on Jun. 18, 2019, which is incorporated by reference herein in its entirety.

BACKGROUND

Technical Field

The present disclosure relates to a photographing lens system and an imaging apparatus, and more particularly, to a photographing lens system and an imaging apparatus applicable to electronic devices.

Description of Related Art

With the advancement of semiconductor process technology, the performance of image sensors has been improved, and the pixels have been reduced to an even smaller size. Therefore, optical lens assemblies with high image quality have become an indispensable part of modern electronic devices.

With the rapid development of technology, applications of electronic devices equipped with optical lens assemblies increase significantly, and the requirements for optical lens assemblies are more diverse. It is difficult for conventional optical lens assemblies to balance among the requirements such as image quality, sensitivity, aperture size, volume or viewing angle. Therefore, there is a need for providing an optical lens assembly to satisfy the aforementioned requirements.

SUMMARY

According to one aspect of the present disclosure, a photographing lens system comprises seven lens elements, in order from an object side to an image side: a first lens element, a second lens element, a third lens element, a fourth lens element, a fifth lens element, a sixth lens element and a seventh lens element; wherein each of the seven lens elements has an object-side surface facing toward the object side and an image-side surface facing toward the image side, the first lens element has negative refractive power, the second lens element has negative refractive power, the fourth lens element has an image-side surface being concave in a paraxial region thereof, the seventh lens element has an image-side surface being concave in a paraxial region thereof and at least one inflection point in an off-axis region thereof, an axial distance between the object-side surface of the first lens element and an image surface is TL, a focal length of the photographing lens system is f, a maximal image height of the photographing lens system is ImgH, a curvature radius of the image-side surface of the fourth lens element is R8, a sum of axial distances between each of adjacent lens elements of the photographing lens system is ΣAT, a sum of central thicknesses of the seven lens elements is ΣCT, and the following conditions are satisfied:

$0.80 < TL/f < 3.60$;

$1.0 < TL/ImgH < 2.10$;

$0.30 < f/R8 < 8.0$; and $0.10 < \Sigma AT/\Sigma CT < 0.83$.

According to another aspect of the present disclosure, an imaging apparatus comprises the aforementioned photographing lens system and an image sensor disposed on an image surface of the photographing lens system.

According to another aspect of the present disclosure, an electronic device comprises at least two imaging apparatuses facing toward the same side, wherein the at least two imaging apparatuses comprises a first imaging apparatus comprising the photographing lens system of claim 1 and a first image sensor; and a second imaging apparatus comprising an optical lens assembly and a second imager sensor; wherein the fields of view of the at least two imaging apparatuses differ by at least 20 degrees.

According to another aspect of the present disclosure, a photographing lens system comprises seven lens elements, in order from an object side to an image side: a first lens element, a second lens element, a third lens element, a fourth lens element, a fifth lens element, a sixth lens element and a seventh lens element; wherein each of the seven lens elements has an object-side surface facing toward the object side and an image-side surface facing toward the image side, the first lens element has negative refractive power, the second lens element has negative refractive power, the image-side surface of the sixth lens element is convex in a paraxial region thereof, the image-side surface of the seventh lens element is concave in a paraxial region thereof and having at least one inflection point in an off-axis region thereof, an axial distance between the object-side surface of the first lens element and an image surface is TL, a focal length of the photographing lens system is f, a maximal image height of the photographing lens system is ImgH, a curvature radius of the image-side surface of the fourth lens element is R8, a curvature radius of the object-side surface of the seventh lens element is R13, and the following conditions are satisfied:

$0.80 < TL/f < 3.60$;

$1.0 < TL/ImgH < 2.10$; and $0.40 < R8/R13$.

According to another aspect of the present disclosure, a photographing lens system comprises seven lens elements, in order from an object side to an image side: a first lens element, a second lens element, a third lens element, a fourth lens element, a fifth lens element, a sixth lens element and a seventh lens element; wherein each of the seven lens elements has an object-side surface facing toward the object side and an image-side surface facing toward the image side, the first lens element has negative refractive power, the second lens element has negative refractive power, the fifth lens element has an image-side surface being concave in a paraxial region thereof, the seventh lens element has an image-side surface being concave in a paraxial region thereof and having at least one inflection point in an off-axis region thereof, an axial distance between the object-side surface of the first lens element and an image surface is TL, a focal length of the photographing lens system is f, an axial distance between the third lens element and the fourth lens element is T34, an axial distance between the fourth lens element and the fifth lens element is T45, an axial distance between the fifth lens element and the sixth lens element is T56, an axial distance between the sixth lens element and the seventh lens element is T67, and the following conditions are satisfied:

$0.80 < TL/f < 3.60$; and $0.20 < (T34+T56+T67)/T45 < 2.80$.

According to another aspect of the present disclosure, a photographing lens system, comprising seven lens elements, in order from an object side to an image side: a first lens element, a second lens element, a third lens element, a fourth lens element, a fifth lens element, a sixth lens element and a seventh lens element; wherein each of the seven lens elements has an object-side surface facing toward the object side and an image-side surface facing toward the image side, the first lens element has negative refractive power, the second lens element has negative refractive power, the image-side surface of the seventh lens element is concave in a paraxial region thereof and having at least one inflection point in an off-axis region thereof, an axial distance between the object-side surface of the first lens element and an image surface is TL, a focal length of the photographing lens system is f, a focal length of the third lens element is f3, a focal length of the sixth lens element is f6, a sum of axial distances between each of adjacent lens elements of the photographing lens system is ΣAT, a sum of central thicknesses of the seven lens elements is ΣCT, and the following conditions are satisfied:

$0.80 < TL/f < 3.60$;

$2.0 < (f/f3)+(f/f6) < 5.0$; and $0.10 < \Sigma AT/\Sigma CT < 0.83$.

BRIEF DESCRIPTION OF THE DRAWINGS

FIG. 9A is a schematic view of an imaging apparatus according to the 9th embodiment of the present disclosure.

DETAILED DESCRIPTION

Figure 1A:
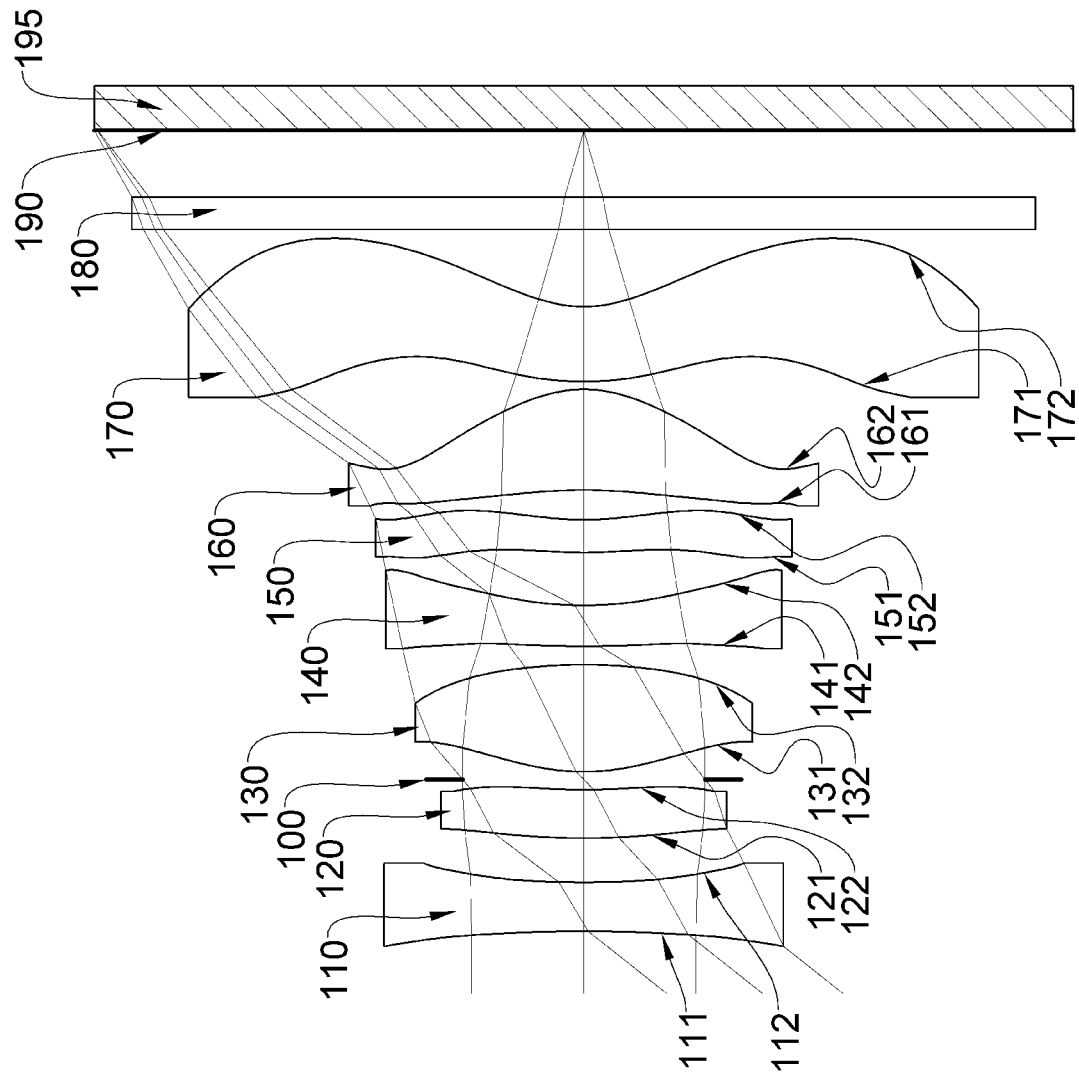
FIG. 1A is a schematic view of an imaging apparatus according to the 1st embodiment of the present disclosure.

The present disclosure provides a photographing lens system including, in order from an object side to an image side, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

The first lens element has negative refractive power. It is favorable for forming a retrofocus structure to enlarge the field of view of the photographing lens system. The object-side surface of the first lens element can be concave in a paraxial region thereof. It is favorable for reducing the size of the photographing lens system with a large view angle. The first lens element can have at least one inflection point. It is favorable for controlling a size of an effective radius of the first lens element to avoid the object side of the photographing lens system being overly large which would have inferior influence on its volume and appearance of the photographing lens system.

The second lens element has negative refractive power. It is favorable for providing the negative refractive power along with the first lens element so as to improve image quality while fulfilling the specification requirement. The image-side surface of the second lens element can be concave in a paraxial region thereof to effectively control the light path while balancing the image quality in various fields of view.

The third lens element can have positive refractive power for providing significant converging power to effectively reduce the size of the photographing lens system for miniaturization. The object-side surface of the third lens element can be convex in a paraxial region thereof to improve the light path and convergence of the photographing lens system.

The fourth lens element can have negative refractive power for balancing the chromatic aberration generated by the third lens element. The image-side surface of the fourth lens element can be concave in a paraxial region thereof. It is favorable for correcting the light path to improve the image quality.

The object-side surface of the fifth lens element can be convex in a paraxial region thereof. It is favorable to correct the field curvature of the photographing lens system. The image-side surface of the fifth lens element can be concave in a paraxial region thereof to effectively control the shape of the fifth lens element. It is favorable for correcting astigmatism and coma aberration.

The sixth lens element can have positive refractive power for providing light convergence ability to effectively controlling the total track length. The image-side surface of the sixth lens element can be convex in a paraxial region thereof to ensure that the sixth lens element has sufficient light convergence ability to avoid light not sufficiently converged and affecting the total track length. The sixth lens element can have at least one inflection point to effectively correct off-axis aberrations so as to improve image quality.

The seventh lens element can have negative refractive power for effectively controlling the back focal length to avoid an overly large total track length of the photographing lens system. The object-side surface of the seventh lens element can be convex in a paraxial region thereof to balance the light path in the tangential direction and the sagittal direction. It is favorable for correcting astigmatism of the photographing lens system. The image-side surface of the seventh lens element is concave in a paraxial region and having at least one inflection point in an off-axis region thereof. It is favorable for reducing the back focus length for miniaturization and further flattening the Petzval surface of the photographing lens system.

An axial distance between the object-side surface of the first lens element and an image surface is TL, and a focal length of the photographing lens system is f. When the following condition is satisfied: $0.80<TL/f<3.60$, it is favorable for balancing the total track length of the photographing lens system and controlling the view angle. Moreover, the following condition can be satisfied: $1.0<TL/f<2.60$.

An axial distance between the object-side surface of the first lens element and the image surface is TL, and the maximal image height of the photographing lens system is ImgH. When the following condition is satisfied: $1.0<TL/ImgH<2.10$, it is favorable for having sufficient image brightness with a proper size light-receiving area while miniaturizing the lens system. Moreover, the following condition can be satisfied: $1.20<TL/ImgH<1.80$.

The focal length of the photographing lens system is f, and a curvature radius of the image-side surface of the fourth lens element is R8. When the following condition is satisfied: $0.30<f/R8<8.0$, it is favorable for configuring the proper curvature on the image-side surface of the fourth lens element so as to better correct astigmatism.

A sum of axial distances between each of adjacent lens elements of the photographing lens system is $\Sigma AT$, and a sum of central thicknesses of the seven lens elements is $\Sigma CT$. When the following condition is satisfied: $0.10<\Sigma AT/\Sigma CT<0.83$, the axial distances between adjacent lens elements are effectively controlled to improve efficiency of the space usage. Moreover, the following condition can be satisfied: $0.08<\Sigma AT/\Sigma CT<0.61$.

A minimum among Abbe numbers of the seven lens elements is V min. When the following condition is satisfied: $10.0<V\ min<22.0$, it is favorable for controlling the lens materials of the photographing lens system so as to balance the focusing positions of light in different wavelength ranges, and to avoid image overlaps. Moreover, the following condition is satisfied: $10.0<V\ min<20.0$. Moreover, the following condition can be satisfied: $10.0<V\ min<19.0$.

An axial distance between the third lens element and the fourth lens element is T34, an axial distance between the fourth lens element and the fifth lens element is T45, an axial distance between the fifth lens element and the sixth lens element is T56, an axial distance between the sixth lens element and the seventh lens element is T67. When the following condition is satisfied: $0.20<(T34+T56+T67)/T45<2.80$, the lens spacing of the photographing lens system is effectively balanced so as to improve lens assembling and the product yield. Moreover, the following condition can be satisfied: $0.20<(T34+T56+T67)/T45<1.85$.

The focal length of the photographing lens system is f, a focal length of the first lens element is f1, and a focal length of the second lens element is f2. When the following condition is satisfied: $-1.50<(f/f1)+(f/f2)<-0.10$, the refractive power distribution of the first lens element and the second lens element is balanced so as to avoid astigmatism from overly large refractive power.

An axial distance between the fourth lens element and the fifth lens element is T45, and an axial distance between the fifth lens element and the sixth lens element is T56. When the following condition is satisfied: $1.10<T45/T56<2.0$, the axial distances of the fourth lens element, the fifth lens element and the sixth lens element are balanced so as to improve lens assembling and reduce sensitivity thereof.

The axial distance between the object-side surface of the first lens element and the image surface is TL, and an entrance pupil diameter of the photographing lens system is EPD. When the following conditions are satisfied: $1.50<TL/EPD<4.0$, it is favorable for providing a short total track length and a large aperture so as to photograph clear images within limited space in the photographing lens system.

The focal length of the photographing lens system is f, and the entrance pupil diameter of the photographing lens system is EPD. When the following condition is satisfied: $1.0<f/EPD<2.0$, it is favorable for adjusting the aperture of the photographing lens system so as to control the amount of the incoming light to improve the image brightness.

The focal length of the second lens element is f2, and the axial distance between the object-side surface of the first lens element and the image surface is TL. When the following condition is satisfied: $f2/TL<-0.70$, it is favorable for correcting astigmatism by the second lens element so as to balance the total track length of the photographing lens system and satisfactory image quality for the market demand. Moreover, the following condition can be satisfied: $-45.0<f2/TL<-1.0$.

The focal length of the photographing lens system is f, the focal length of the first lens element is f1, the focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, wherein a minimum among |f/f1|, |f/f2|, |f/f3|, |f/f4|, |f/f5|, |f/f6| and |f/f7| is |f/fi|min. When the following condition is satisfied: $|f/fi|min<0.15$, it is favorable for the photographing lens system having at least one correction lens so as to correct the off-axis astigmatism. Moreover, the following condition can be satisfied: $|f/fi|min<0.065$.

A curvature radius of the object-side surface of the third lens element is R5, and a curvature radius of the image-side surface of the third lens element is R6. When the following condition is satisfied: $-1.0<(R5+R6)/(R5-R6)<0$, the shape of the third lens element is balanced. It is favorable for correcting astigmatism produced from the first lens element and the second lens element to improve the image quality.

An axial distance between an aperture stop and the image-side surface of the seventh lens element is SD, an axial distance between the object-side surface of the first lens element and the image-side surface of the seventh lens element is TD. When the following condition is satisfied:

$0.60<SD/TD<0.88$, it is favorable for balancing the aperture stop position so as to control the size of the photographing lens system.

Half of a maximum field of view of the photographing lens system is HFOV. When the following condition is satisfied: 43.0 degrees<HFOV<70.0 degrees, it is favorable for enlarging the field of view for applications in various fields.

The axial distance between the fifth lens element and the sixth lens element is T56, and the axial distance between the sixth lens element and the seventh lens element is T67. When the following condition is satisfied: $0<T67/T56<0.90$, the axial distance between the sixth lens element and the seventh lens element is effectively reduced so as to balance the total track length. Moreover, the following condition can be satisfied: $0<T67/T56<0.50$.

A curvature radius of the image-side surface of the fourth lens element is R8, and a curvature radius of the object-side surface of the seventh lens element is R13. When the following condition is satisfied: $0.40<R8/R13$, the surface shapes of the fourth lens element and the seventh lens element are well controlled to balance astigmatism. Moreover, the following condition can be satisfied: $0.50<R8/R13<4.0$.

An Abbe number of the second lens element is V2, and an Abbe number of the fourth lens element is V4. When the following condition is satisfied: $0.10<V4/V2<0.50$, the capability for controlling the light in different wavelength ranges of the second lens element and the fourth lens element is balanced so as to correct chromatic aberration.

An axial distance between the image-side surface of the seventh lens element and the image surface is BL, and the entrance pupil diameter of the photographing lens system is EPD. When the following condition is satisfied: $0.20<BL/EPD<1.0$, the back focal length of the photographing lens system is effectively compressed while maintaining the proper size of the entrance pupil to provide sufficient image brightness in limited space.

The axial distance between the third lens element and the fourth lens element is T34, and the axial distance between the fourth lens element and the fifth lens element is T45. When the following condition is satisfied: $0.03<T34/T45<1.0$, the axial distances of the adjacent lens elements in the middle section of the photographing lens system are balanced so as to avoid wasting space and failing to reduce the size of the photographing lens assembly.

An Abbe number of the first lens element is V1, the Abbe number of the second lens element is V2, an Abbe number of the third lens element is V3, the Abbe number of the fourth lens element is V4, an Abbe number of the fifth lens element is V5, an Abbe number of the sixth lens element is V6, an Abbe number of the seventh lens element is V7, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, wherein a minimum among V1/N1, V2/N2, V3/N3, V4/N4, V5/N5, V6/N6 and V7/N7 is (Vi/Ni)min. When the following condition is satisfied: $5.0<(Vi/Ni)min<11.8$, it is favorable to improve the chromatic correction.

The focal length of the photographing lens system is f, and the focal length of the fifth lens element is f5. When the following condition is satisfied: $-0.55<f/f5<0.50$, the fifth lens element can balance astigmatism produced from the lens elements adjacent to the fifth lens element.

The focal length of the photographing lens system is f, and a curvature radius of the image-side surface of the fifth lens element is R10. When the following condition is satisfied: $0.50<f/R10<5.0$, it is favorable for miniaturization by reducing the back focal length of the photographing lens system. Moreover, the following condition can be satisfied: $1.10<f/R10<5.0$.

The axial distance between the object-side surface of the first lens element and the image surface is TL, the focal length of the photographing lens system is f, a maximal image height of the photographing lens system is ImgH, and the entrance pupil diameter of the photographing lens system is EPD. When the following condition is satisfied: $1.50<(TL*f)/(ImgH*EPD)<4.30$, it is favorable for miniaturization with a high quantity of incident light. Moreover, the following condition can be satisfied: $1.80<(TL*f)/(ImgH*EPD)<3.50$.

A vertical distance between an off-axial critical point nearest to an optical axis on the image-side surface of the fifth lens element and the optical axis is Yc52, a central thickness of the fifth lens element is CT5. When the following condition is satisfied: $0.10<Yc52/CT5<10.0$, it is favorable for correcting the image field curvature to improve peripheral image quality.

The focal length of the photographing lens system is f, the focal length of the third lens element is f3, and the focal length of the sixth lens element is f6. When the following condition is satisfied: $2.0<(f/f3)+(f/f6)<5.0$, the photographing lens system has sufficient converging power to achieve favorable specifications in limited space.

The Abbe number of the fifth lens element is V5. When the following condition is satisfied: $10.0<V5<35.0$, it is favorable for balancing chromatic aberrations by the fifth lens element so as to avoid the imaging position shift in the different wavelength ranges.

The focal length of the photographing lens system is f, and the maximal image height of the photographing lens system is ImgH. When the following condition is satisfied: $0.45<f/ImgH<1.05$, the photographing lens system can obtain a wider imaging area with more detail imaging information.

According to the present disclosure, the aforementioned features and conditions can be utilized in numerous combinations so as to achieve corresponding effects.

According to the photographing lens system of the present disclosure, the lens elements thereof can be made of glass or plastic material. When the lens elements are made of glass material, the distribution of the refractive power of the photographing lens system may be more flexible to design. Technologies such as grinding or molding can be used for producing glass lens elements. When the lens elements are made of plastic material, manufacturing costs can be effectively reduced. Furthermore, surfaces of each lens element can be arranged to be aspheric (ASP). Since these aspheric surfaces can be easily formed into shapes other than spherical shapes so as to have more control variables for eliminating aberrations and to further decrease the required quantity of lens elements, the total track length of the photographing lens system can be effectively reduced. Process such as plastic injection molding or molded glass lens can be used for making the aspheric surfaces.

According to the photographing lens system of the present disclosure, additives may be selectively added to the material of any one (or more) lens element to change the transmittance of said lens element in a particular wavelength range of light, so as to further reduce stray light and chromatic aberrations. For example, an additive that can filter off light in the wavelength range of 600-800 nm may be added to reduce extra red or infrared light, or an additive that can filter off light in the wavelength range of 350-450 nm may be added to reduce blue or ultraviolet light in the lens assembly. Thus, additives can prevent the interference caused to the image by light in a particular wavelength range. In addition, additives may be evenly mixed in the plastic material for manufacturing lens elements with an injection molding process.

According to the photographing lens system of the present disclosure, if a surface of a lens element is aspheric, it means that the surface has an aspheric shape throughout its optically effective area, or a portion(s) thereof.

According to the photographing lens system of the present disclosure, when the lens element has a convex surface and the region of convex shape is not defined, it indicates that the surface can be convex in the paraxial region thereof. When the lens element has a concave surface and the region of concave shape is not defined, it indicates that the surface can be concave in the paraxial region thereof. Likewise, when the region of refractive power or focal length of a lens element is not defined, it indicates that the region of refractive power or focal length of the lens element can be in the paraxial region thereof.

According to the photographing lens system of the present disclosure, a point of inflection is a transition point at which the curvature of a lens surface changes its sign from positive to negative and vice versa. A critical point is a non-axial point on the lens surface where a tangential plane of the point is perpendicular to the optical axis.

According to the photographing lens system of the present disclosure, the image surface of the photographing lens system, based on the corresponding image sensor, can be a plane or a curved surface with an arbitrary curvature, especially a curved surface being concave facing towards the object side. Meanwhile, the photographing lens system of the present disclosure may optionally include one or more image correction components (such as a field flattener) between the image surface and the lens element closest to the image surface for the purpose of image corrections (such as field curvature correction). The optical properties of the image correction components such as curvatures, thicknesses, indices, positions and shapes (convex or concave, spherical or aspheric, diffractive surface and Fresnel surface, etc.) can be adjusted according to the requirement of the imaging apparatus. Preferably, an image correction component may be a thin plano-concave component having a surface being concave toward the object side and be arranged near the image surface.

According to the photographing lens system of the present disclosure, the photographing lens system can include at least one stop, such as an aperture stop, a glare stop or a field stop, so as to favorably reduce the amount of stray light and thereby improving the image quality.

According to the photographing lens system of the present disclosure, an aperture stop can be configured as a front stop or a middle stop. The front stop disposed between an imaged object and the first lens element can provide a longer distance between an exit pupil of the photographing lens system and the image surface so that the generated telecentric effect can improve the image-sensing efficiency of an image sensor, such as a CCD or CMOS sensor. The middle stop disposed between the first lens element and the image surface is favorable for enlarging the field of view of the photographing lens system, thereby providing the optical lens assembly with the advantage of a wide-angle lens.

An aperture control unit may be disposed in the photographing lens system of the present disclosure. The aperture control unit may be a mechanical part or optical moderation part, in which the size and shape of the aperture may be controlled by electricity or electronic signals. The mechanical part may include moving parts such as blades, shielding sheets, etc. The optical moderation part may include shielding materials such as filters, electrochromic materials, liquid crystal layers, etc. The aperture control unit can control the amount of incoming light and exposure time so as to further improve the image quality. Meanwhile, the aperture control unit may represent the aperture in the present disclosure that can adjust the image properties such as depth of field or exposure speed by changing the f-number of the lens assembly.

The photographing lens system of the present disclosure can be applied to a wide range of 3D (three-dimensional) image capturing applications and electronic devices, such as digital cameras, mobile devices, digital tablets, smart TVs, network surveillance devices, somatosensory game machines, driving recording systems, rear view camera systems, wearable devices and drone cameras.

The present disclosure further provides an imaging apparatus including the aforementioned photographing lens system and an image sensor, wherein the image sensor is disposed on or near an image surface of the photographing lens system. By arranging the shape of the first lens element of the photographing lens system to have a reduced effective radius, the size of the whole photographing lens system can be reduced, which is favorable for minimizing the photographing lens system. Moreover, the imaging apparatus can further include a barrel member, a holding member or a combination thereof.

The present disclosure further provides an electronic device including the aforementioned imaging apparatus, the imaging apparatus including the photographing lens system and an image sensor, wherein the image sensor is disposed on or near an image surface of the photographing lens system. Moreover, the electronic device can further include a control unit, a display unit, a storage unit, a random access memory (RAM) unit or a combination thereof.

According to the above description of the present disclosure, the following specific embodiments are provided for further explanation.

1st Embodiment

Figure 1B:
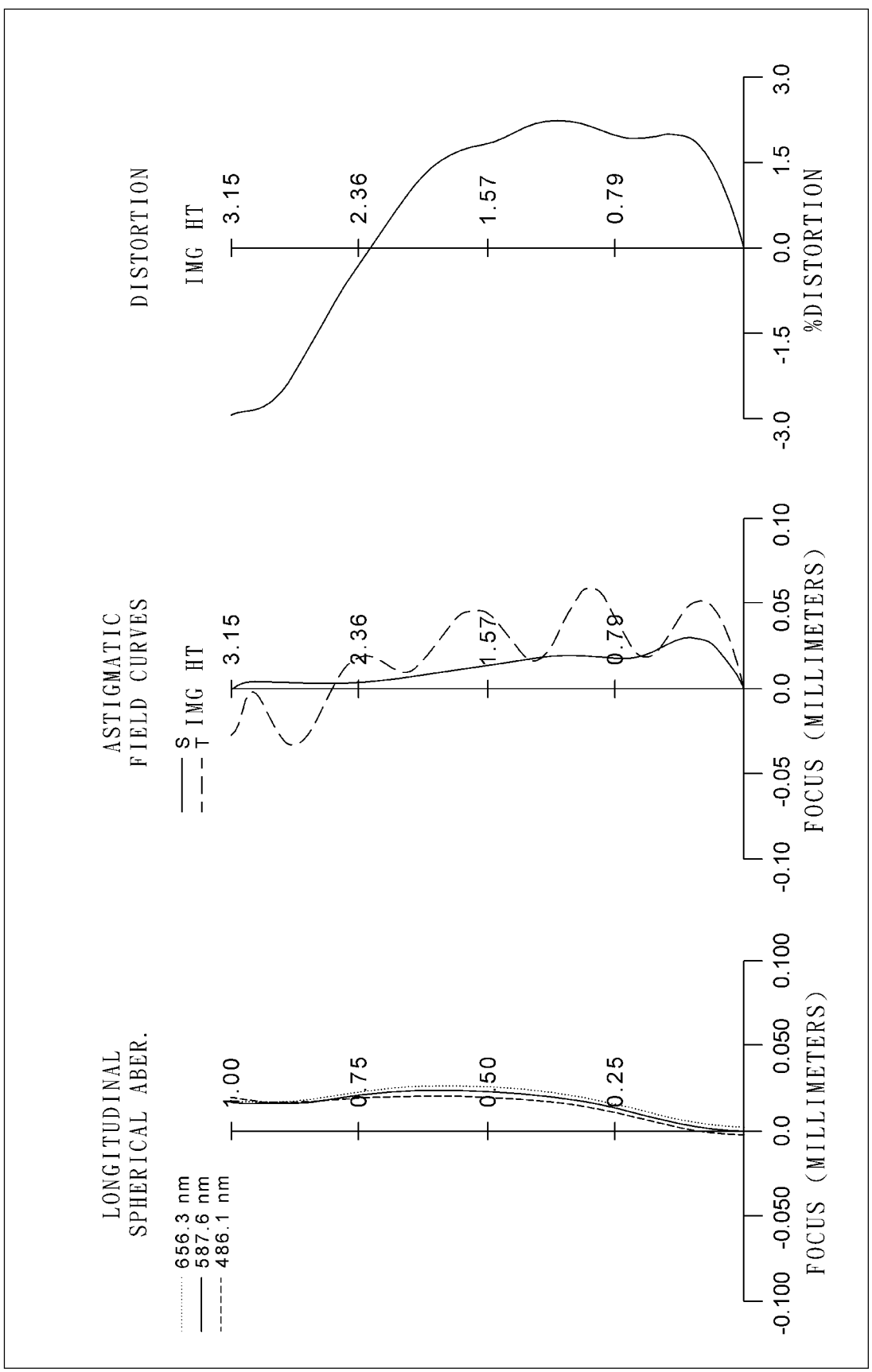
FIG. 1B shows longitudinal spherical aberration curves, astigmatic field curves and a distortion curve of the imaging apparatus according to the 1st embodiment.

FIG. 1A is a schematic view of an imaging apparatus according to the 1st embodiment of the present disclosure. FIG. 1B shows, in order from left to right, longitudinal spherical aberration curves, astigmatic field curves and a distortion curve of the imaging apparatus according to the 1st embodiment.

In FIG. 1A, the imaging apparatus includes a photographing lens system (not otherwise herein labeled) of the present disclosure and an image sensor 195. The photographing lens system includes, in order from an object side to an image side, a first lens element 110, a second lens element 120, an aperture stop 100, a third lens element 130, a fourth lens element 140, a fifth lens element 150, a sixth lens element 160, a seventh lens element 170, and an image surface 190. The image sensor 195 is disposed on or near the image surface 190, and the photographing lens system includes seven lens elements (110, 120, 130, 140, 150, 160 and 170) without any other lens element being inserted between them.

The first lens element 110 has negative refractive power and is made of plastic material. The first lens element 110 has an object-side surface 111 being concave in a paraxial region thereof, and an image-side surface 112 being concave in a paraxial region thereof. Both the object-side surface 111 and the image-side surface 112 are aspheric.

The second lens element 120 has negative refractive power and is made of plastic material. The second lens element 120 has an object-side surface 121 being convex in a paraxial region thereof, and an image-side surface 122 being concave in a paraxial region thereof. Both the object-side surface 121 and the image-side surface 122 are aspheric.

The third lens element 130 has positive refractive power and is made of plastic material. The third lens element 130 has an object-side surface 131 being convex in a paraxial region thereof, and an image-side surface 132 being convex in a paraxial region thereof. Both the object-side surface 131 and the image-side surface 132 are aspheric.

The fourth lens element 140 has negative refractive power and is made of plastic material. The fourth lens element 140 has an object-side surface 141 being convex in a paraxial region thereof, and an image-side surface 142 being concave in a paraxial region thereof. Both the object-side surface 141 and the image-side surface 142 are aspheric.

The fifth lens element 150 has negative refractive power and is made of plastic material. The fifth lens element 150 has an object-side surface 151 being convex in a paraxial region thereof, and an image-side surface 152 being concave in a paraxial region with at least one critical point in an off-axis region thereof. Both the object-side surface 151 and the image-side surface 152 are aspheric.

The sixth lens element 160 has positive refractive power and is made of plastic material. The sixth lens element 160 has an object-side surface 161 being concave in a paraxial region with at least one inflection point in an off-axis region thereof, and an image-side surface 162 being convex in a paraxial region with at least one inflection point in an off-axis region thereof. Both the object-side surface 161 and the image-side surface 162 are aspheric.

The seventh lens element 170 has negative refractive power and is made of plastic material. The seventh lens element 170 has an object-side surface 171 being convex in a paraxial region, and an image-side surface 172 being concave in a paraxial region with at least one inflection point in an off-axis region thereof. Both the object-side surface 171 and the image-side surface 172 are aspheric.

The photographing lens system further includes a filter 180 disposed between the seventh lens element 170 and the image surface 190. The filter 180 is made of glass material and does not affect a focal length of the photographing lens system.

Figure 10:
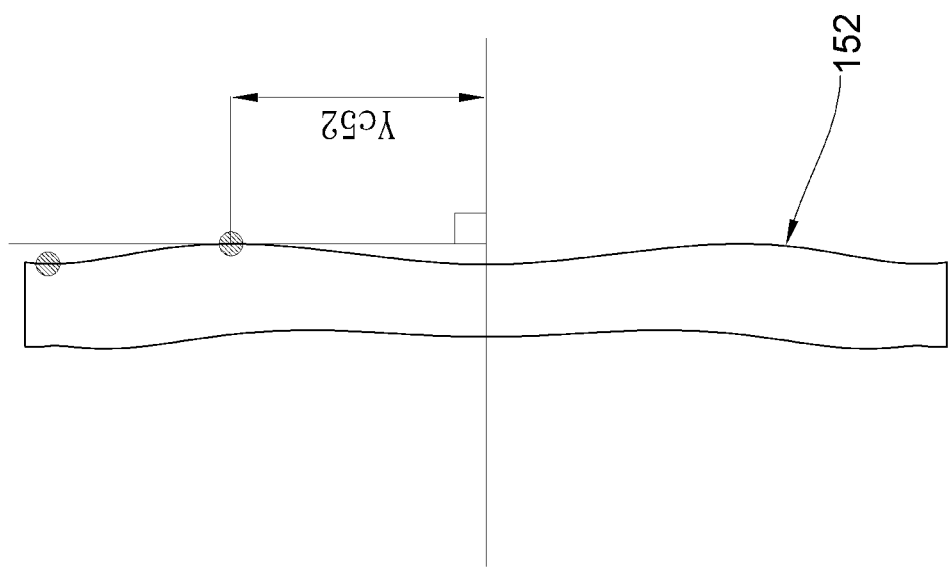
FIG. 10 is a schematic showing a distance represented by the parameter Yc52 of a photographing lens system in the embodiment 1 of the present disclosure as example.

Please refer to FIG. 10, which is a schematic view showing parameter Yc52 of the 1st embodiment of the present disclosure as an example. As shown, Yc52 is defined as a vertical distance between an off-axial critical point nearest to an optical axis on the image-side surface of the fifth lens element and the optical axis.

The detailed optical data of the 1st embodiment are shown in TABLE 1, and the aspheric surface data are shown in TABLE 2, wherein the units of the curvature radius, the thickness and the focal length are expressed in mm, f is a focal length of the photographing lens system, Fno is an f-number of the photographing lens system, HFOV is a half of the maximal field of view, and surfaces #1 to #18 refer to the surfaces in order from the object side to the image side. The aspheric surface data are shown in TABLE 2, wherein k is the conic coefficient in the equation of the aspheric surface profiles, and A4-A18 refer to the 4th to 18th order aspheric coefficients.

Further, it should be noted that the tables shown in each of the following embodiments are associated with the schematic view and diagrams of longitudinal spherical aberration curves, astigmatic field curves and a distortion curve for the respective embodiment. Also, the definitions of the parameters presented in later tables are the same as those of the parameters presented in TABLE 1 and TABLE 2 for the 1st embodiment. Explanations in this regard will not be provided again.

TABLE 1

(1st embodiment)
f = 2.56 mm, Fno = 1.76, HFOV = 51.7 deg.

| Surface# | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −9.002 | ASP | 0.318 | Plastic | 1.535 | 56.3 | −7.64 |
| 2 | | 7.570 | ASP | 0.286 | | | | |
| 3 | Lens 2 | 4.608 | ASP | 0.313 | Plastic | 1.544 | 55.9 | −19.83 |
| 4 | | 3.152 | ASP | 0.067 | | | | |
| 5 | Ape. Stop | Plano | | 0.050 | | | | |
| 6 | Lens 3 | 1.361 | ASP | 0.694 | Plastic | 1.544 | 55.9 | 1.84 |
| 7 | | −3.121 | ASP | 0.118 | | | | |
| 8 | Lens 4 | 7.921 | ASP | 0.265 | Plastic | 1.671 | 19.5 | −4.99 |
| 9 | | 2.323 | ASP | 0.343 | | | | |
| 10 | Lens 5 | 2.829 | ASP | 0.212 | Plastic | 1.583 | 30.2 | −7.42 |
| 11 | | 1.664 | ASP | 0.193 | | | | |
| 12 | Lens 6 | −3.991 | ASP | 0.654 | Plastic | 1.544 | 55.9 | 1.68 |
| 13 | | −0.786 | ASP | 0.051 | | | | |
| 14 | Lens 7 | 2.132 | ASP | 0.485 | Plastic | 1.544 | 55.9 | −2.74 |
| 15 | | 0.808 | ASP | 0.500 | | | | |
| 16 | Filter | Plano | | 0.210 | Glass | 1.517 | 64.2 | — |
| 17 | | Plano | | 0.431 | | | | |
| 18 | Image | Plano | | — | | | | |

\* Reference Wavelength d-line 587.6 nm

TABLE 2

Aspheric Coefficients

| Surface# | 1 | 2 | 3 | 4 | 6 | 7 | 8 |
|---|---|---|---|---|---|---|---|
| k= | −1.7758E+01 | −2.4216E+01 | −1.1069E+00 | −1.3408E+01 | −7.4247E+00 | −4.7573E+00 | −1.0000E+00 |
| A4= | 3.8051E−02 | 1.0705E−01 | −5.4969E−02 | −4.1742E−01 | −7.7952E−03 | 1.2660E−01 | 9.1650E−02 |
| A6= | −5.0154E−02 | −5.5278E−02 | 2.1959E−01 | 7.8607E−01 | 4.6348E−02 | −4.6198E−01 | −5.4845E−01 |
| A8= | 1.2106E−02 | −5.9751E−02 | −5.3384E−01 | −1.2938E+00 | −1.8767E−01 | 5.1679E−01 | 5.2721E−01 |
| A10= | −2.2566E−03 | 4.9739E−02 | 4.5116E−01 | 1.1254E+00 | 1.4193E−01 | −2.7822E−01 | 5.4981E−03 |
| A12= | 8.3135E−03 | 8.3790E−03 | −1.2862E−01 | −3.8894E−01 | −3.5106E−02 | 5.2549E−02 | −2.0575E−01 |
| A14= | −4.8379E−03 | | | | | | 6.7727E−02 |
| A16= | 7.7744E−04 | | | | | | |

| Surface # | 9 | 10 | 11 | 12 | 13 | 14 | 15 |
|---|---|---|---|---|---|---|---|
| k= | 1.7168E+00 | −8.9998E+01 | −3.2699E+01 | 5.9775E+00 | −5.9758E+00 | −1.7256E−01 | −4.0620E+00 |
| A4= | −1.1615E−02 | −1.6661E−01 | −9.8217E−02 | −1.5034E−01 | −4.8448E−01 | 1.1381E−01 | 1.3549E−02 |
| A6= | −2.2859E−01 | −6.8981E−02 | 5.5284E−02 | 1.1688E+00 | 1.1977E+00 | −4.7386E−01 | −1.1048E−01 |
| A8= | 2.3746E−01 | 2.8714E−01 | −1.3699E−01 | −2.5360E+00 | −1.9403E+00 | 4.3947E−01 | 8.8806E−02 |
| A10= | −7.7534E−02 | −2.6520E−01 | 6.0469E−02 | 2.8492E+00 | 1.9216E+00 | −2.2622E−01 | −3.7172E−02 |
| A12= | −1.5517E−03 | 1.3843E−01 | 7.3638E−02 | −1.8075E+00 | −1.1076E+00 | 7.0094E−02 | 9.1309E−03 |
| A14= | | −3.1524E−02 | −6.3203E−02 | 6.5176E−01 | 3.6998E−01 | −1.2927E−02 | −1.3259E−03 |
| A16= | | | 1.3341E−02 | −1.2251E−01 | −6.7302E−02 | 1.3086E−03 | 1.0541E−04 |
| A18= | | | | 8.8212E−03 | 5.2004E−03 | −5.6195E−05 | −3.5353E−06 |

The equation of the aspheric surface profiles is expressed as follows:

$$X(Y) = (Y^2/R)/\left(1 + \text{sqrt}(1 - (1+k)*(Y/R)^2)\right) + \sum_i (Ai)*(Y^i)$$

where:

X is the relative distance between a point on the aspheric surface spaced at a distance Y from the optical axis and the tangential plane at the aspheric surface vertex on the optical axis;

Y is the vertical distance from the point on the aspheric surface profile to the optical axis;

R is the curvature radius;

k is the conic coefficient; and

Ai is the i-th aspheric coefficient.

In the 1st embodiment, the focal length of the photographing lens system is f, the f-number of the photographing lens system is Fno, half of the maximal field of view of the photographing lens system is HFOV, and the following condition is satisfied: f=2.56 mm; Fno=1.76; HFOV=51.7 degrees.

In the 1st embodiment, an Abbe number of the fifth lens element 150 is V5, and the following condition is satisfied: V5=30.2.

In the 1st embodiment, the fourth lens element 140 has the minimum among the Abbe numbers of the seven lens elements, a minimum among Abbe numbers of the seven lens elements is V min, and the following condition is satisfied: V min=19.5.

In the 1st embodiment, an Abbe number of the second lens element 120 is V2, an Abbe number of the fourth lens element 140 is V4, and the following condition is satisfied: V4/V2=0.35.

In the 1st embodiment, an Abbe number of the first lens element 110 is V1, the Abbe number of the second lens element 120 is V2, an Abbe number of the third lens element 130 is V3, the Abbe number of the fourth lens element 140 is V4, the Abbe number of the fifth lens element 150 is V5, an Abbe number of the sixth lens element 160 is V6, an Abbe number of the seventh lens element 170 is V7, a refractive index of the first lens element 110 is N1, a refractive index of the second lens element 120 is N2, a refractive index of the third lens element 130 is N3, a refractive index of the fourth lens element 140 is N4, a refractive index of the fifth lens element 150 is N5, a refractive index of the sixth lens element 160 is N6, a refractive index of the seventh lens element 170 is N7, a minimum among V1/N1, V2/N2, V3/N3, V4/N4, V5/N5, V6/N6 and V7/N7 is (Vi/Ni)min, and the following condition is satisfied: (Vi/Ni)min=11.67.

In the 1st embodiment, a sum of axial distances between each of adjacent lens elements of the photographing lens system is ΣAT, a sum of central thicknesses of the seven lens elements is ΣCT, and the following condition is satisfied: ΣAT/ΣCT=0.38.

In the 1st embodiment, an axial distance between the third lens element 130 and the fourth lens element 140 is T34, an axial distance between the fourth lens element 140 and the fifth lens element 150 is T45, and the following condition is satisfied: T34/T45=0.35.

In the 1st embodiment, an axial distance between the fourth lens element 140 and the fifth lens element 150 is T45, an axial distance between the fifth lens element 150 and the sixth lens element 160 is T56, and the following condition is satisfied: T45/T56=1.78.

In the 1st embodiment, an axial distance between the fifth lens element 150 and the sixth lens element 160 is T56, an axial distance between the sixth lens element 160 and seventh lens element 170 is T67, and the following condition is satisfied: T67/T56=0.26.

In the 1st embodiment, an axial distance between the third lens element 130 and the fourth lens element 140 is T34, an axial distance between the fourth lens element 140 and the fifth lens element 150 is T45, an axial distance between the fifth lens element 150 and the sixth lens element 160 is T56, an axial distance between the sixth lens element 160 and the seventh lens element 170 is T67, and the following condition is satisfied: (T34+T56+T67)/T45=1.06.

In the 1st embodiment, a focal length of the photographing lens system is f, a curvature radius of the image-side surface 142 of the fourth lens element 140 is R8, and the following condition is satisfied: f/R8=1.10.

In the 1st embodiment, the focal length of the photographing lens system is f, a curvature radius of the image-side surface 152 of the fifth lens element 150 is R10, and the following condition is satisfied: f/R10=1.54.

In the 1st embodiment, a curvature radius of the image-side surface 142 of the fourth lens element 140 is R8, a curvature radius of the object-side surface 171 of the seventh lens element 170 is R13, and the following condition is satisfied: R8/R13=1.09.

In the 1st embodiment, a curvature radius of the object-side surface 131 of the third lens element 130 is R5, a curvature radius of the image-side surface 132 of the third lens element 130 is R6, and the following condition is satisfied: (R5+R6)/(R5−R6)=−0.39.

In the 1st embodiment, the focal length of the photographing lens system is f, a focal length of the fifth lens element 150 is f5, and the following condition is satisfied: f/f5=−0.34.

In the 1st embodiment, a focal length of the second lens element 120 is f2, an axial distance between the object-side surface 111 of the first lens element 110 and the image surface 190 is TL, and the following condition is satisfied: f2/TL=−3.82.

In the 1st embodiment, the focal length of the photographing lens system is f, a focal length of the first lens element 110 is f1, the focal length of the second lens element 120 is f2, and the following condition is satisfied: (f/f1)+(f/f2)=−0.46.

In the 1st embodiment, the focal length of the photographing lens system is f, a focal length of the third lens element 130 is f3, a focal length of the sixth lens element 160 is f6, and the following condition is satisfied: (f/f3)+(f/f6)=2.91.

In the 1st embodiment, the focal length of the photographing lens system is f, the focal length of the first lens element 110 is f1, the focal length of the second lens element 120 is f2, the focal length of the third lens element 130 is f3, a focal length of the fourth lens element 140 is f4, the focal length of the fifth lens element 150 is f5, a focal length of the sixth lens element 160 is f6, a focal length of the seventh lens element 170 is f7, a minimum among |f/f1|, |f/f2|, |f/f3|, |f/f4|, |f/f5|, |f/f6| and |f/f7| is |f/fi|min, and the following condition is satisfied: |f/fi|min=0.13.

In the 1st embodiment, the focal length of the photographing lens system is f, an entrance pupil diameter of the photographing lens system is EPD, and the following condition is satisfied: f/EPD=1.76.

In the 1st embodiment, an axial distance between the object-side surface 111 of the first lens element 110 and an image surface 190 is TL, the focal length of the photographing lens system is f, and the following condition is satisfied: TL/f=2.03.

In the 1st embodiment, the axial distance between the object-side surface 111 of the first lens element 110 and an image surface 190 is TL, a maximal image height of the photographing lens system is ImgH, and the following condition is satisfied: TL/ImgH=1.65.

In the 1st embodiment, the axial distance between the object-side surface 111 of the first lens element 110 and the image surface 190 is TL, an entrance pupil diameter of the photographing lens system is EPD, and the following condition is satisfied: TL/EPD=3.57.

In the 1st embodiment, the focal length of the photographing lens system is f, the maximal image height of the photographing lens system is ImgH, and the following condition is satisfied: f/ImgH=0.81.

In the 1st embodiment, an axial distance between the aperture stop 100 and the image-side surface 172 of the seventh lens element 170 is SD, an axial distance between the object-side surface 111 of the first lens element 110 and the image-side surface 172 of the seventh lens element 170 is TD, and the following condition is satisfied: SD/TD=0.76.

In the 1st embodiment, an axial distance between the image-side surface 172 of the seventh lens element 170 and the image surface 190 is BL, an entrance pupil diameter of the photographing lens system is EPD, and the following condition is satisfied: BL/EPD=0.79.

In the 1st embodiment, a vertical distance between an off-axial critical point nearest to an optical axis on the image-side surface 152 of the fifth lens element 150 and the optical axis is Yc52, a central thickness of the fifth lens element 150 is CT5, and the following condition is satisfied: Yc52/CT5=3.52.

In the 1st embodiment, the axial distance between the object-side surface 111 of the first lens element 110 and the image surface 190 is TL, the focal length of the photographing lens system is f, the maximal image height of the photographing lens system is ImgH, the entrance pupil diameter of the photographing lens system is EPD, and the following condition is satisfied: (TL*f)/(ImgH*EPD)=2.90.

2nd Embodiment

Figure 2A:
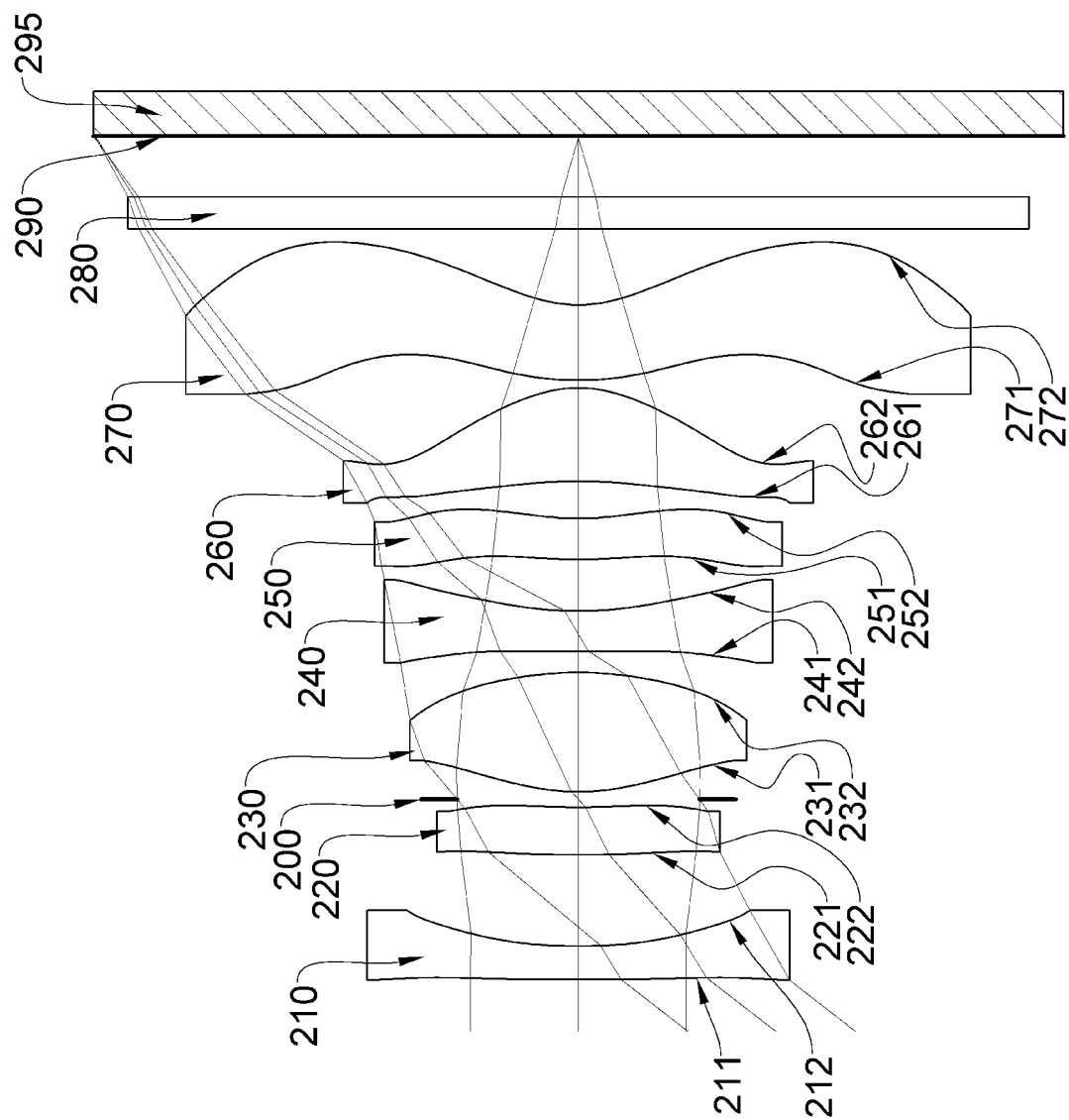
FIG. 2A is a schematic view of an imaging apparatus according to the 2nd embodiment of the present disclosure.
Figure 2B:
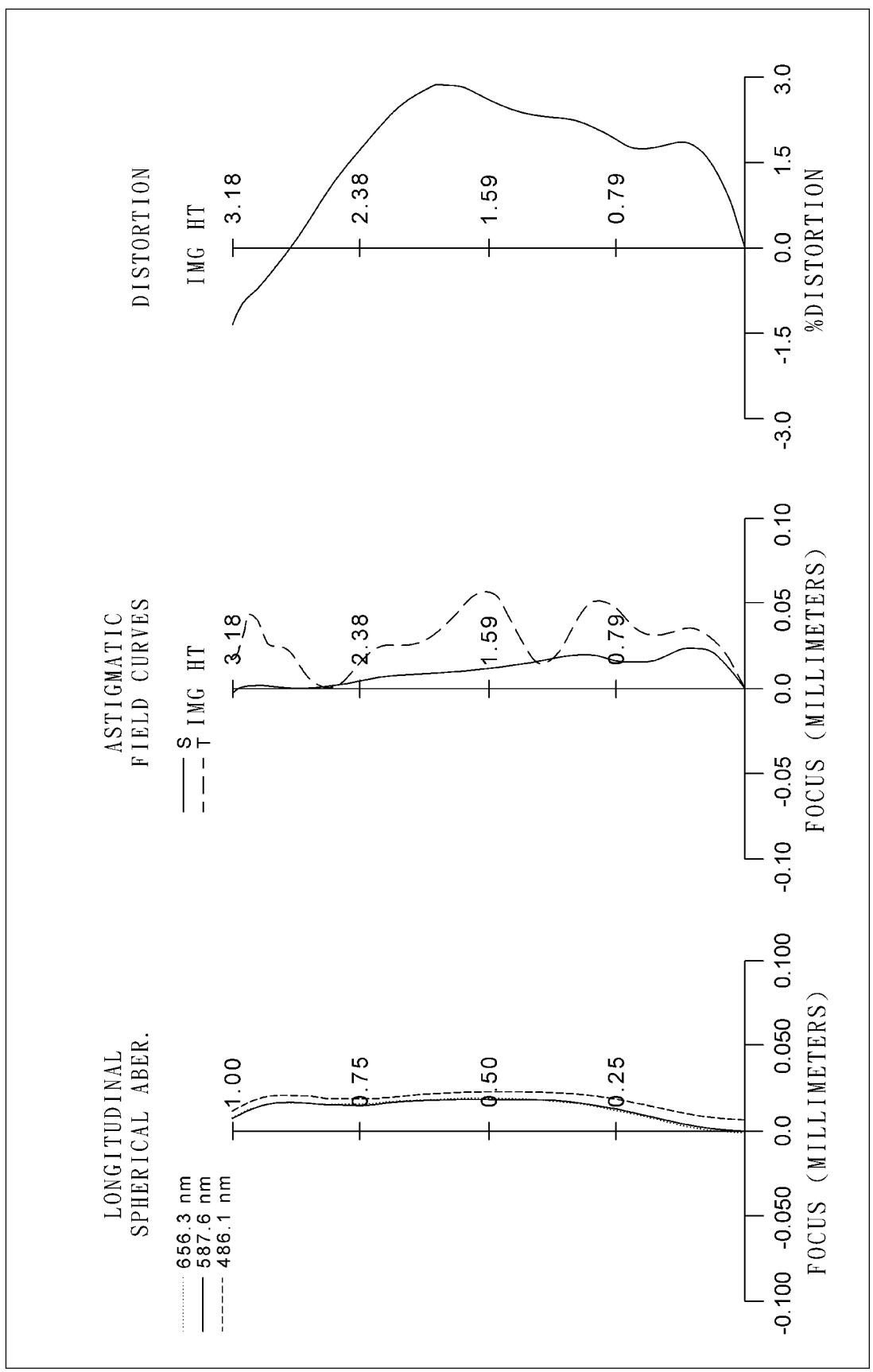
FIG. 2B shows longitudinal spherical aberration curves, astigmatic field curves and a distortion curve of the imaging apparatus according to the 2nd embodiment.

FIG. 2A is a schematic view of an imaging apparatus according to the 2nd embodiment of the present disclosure. FIG. 2B shows, in order from left to right, longitudinal spherical aberration curves, astigmatic field curves and a distortion curve of the imaging apparatus according to the 2nd embodiment.

In FIG. 2A, the imaging apparatus includes a photographing lens system (not otherwise herein labeled) of the present disclosure and an image sensor 295. The photographing lens system includes, in order from an object side to an image side, a first lens element 210, a second lens element 220, an aperture stop 200, a third lens element 230, a fourth lens element 240, a fifth lens element 250, a sixth lens element 260, a seventh lens element 270, and an image surface 290. The image sensor 295 is disposed on or near the image surface 290, and the photographing lens system includes seven lens elements (210, 220, 230, 240, 250, 260 and 270) without any other lens element being inserted between them.

The first lens element 210 has negative refractive power and is made of plastic material. The first lens element 210 has an object-side surface 211 being convex in a paraxial region with at least one inflection point in an off-axis region thereof, and an image-side surface 212 being concave in a paraxial region thereof. Both the object-side surface 111 and the image-side surface 112 are aspheric.

The second lens element 220 has negative refractive power and is made of plastic material. The second lens element 220 has an object-side surface 221 being convex in a paraxial region thereof, and an image-side surface 222 being concave in a paraxial region thereof. Both the object-side surface 221 and the image-side surface 222 are aspheric.

The third lens element 230 has positive refractive power and is made of plastic material. The third lens element 230 has an object-side surface 231 being convex in a paraxial region thereof, and an image-side surface 232 being convex in a paraxial region thereof. Both the object-side surface 231 and the image-side surface 232 are aspheric.

The fourth lens element 240 has negative refractive power and is made of plastic material. The fourth lens element 240 has an object-side surface 241 being concave in a paraxial region thereof, and an image-side surface 242 being concave in a paraxial region thereof. Both the object-side surface 241 and the image-side surface 242 are aspheric.

The fifth lens element 250 has negative refractive power and is made of plastic material. The fifth lens element 250 has an object-side surface 151 being convex in a paraxial region thereof, and an image-side surface 252 being concave in a paraxial region with at least one critical point in an off-axis region thereof. Both the object-side surface 251 and the image-side surface 252 are aspheric.

The sixth lens element 260 has positive refractive power and is made of plastic material. The sixth lens element 260 has an object-side surface 261 being concave in a paraxial region with at least one inflection point in an off-axis region thereof, and an image-side surface 262 being convex in a paraxial region with at least one inflection point in an off-axis region thereof. Both the object-side surface 261 and the image-side surface 262 are aspheric.

The seventh lens element 270 has negative refractive power and is made of plastic material. The seventh lens element 270 has an object-side surface 271 being convex in a paraxial region, and an image-side surface 272 being concave in a paraxial region with at least one inflection point in an off-axis region thereof. Both the object-side surface 271 and the image-side surface 272 are aspheric.

The photographing lens system further includes a filter 280 disposed between the seventh lens element 270 and the image surface 290. The filter 280 is made of glass material and does not affect a focal length of the photographing lens system.

The detailed optical data of the 2nd embodiment are shown in TABLE 3, and the aspheric surface data are shown in TABLE 4.

TABLE 3

(2nd embodiment)
f = 2.50 mm, Fno = 1.76, HFOV = 52.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 60.511 | ASP | 0.221 | Plastic | 1.535 | 56.3 | −7.16 |
| 2 | | 3.595 | ASP | 0.601 | | | | |
| 3 | Lens 2 | 7.674 | ASP | 0.314 | Plastic | 1.544 | 55.9 | −19.40 |
| 4 | | 4.380 | ASP | 0.052 | | | | |
| 5 | Ape. Stop | Plano | | 0.050 | | | | |
| 6 | Lens 3 | 1.412 | ASP | 0.786 | Plastic | 1.544 | 55.9 | 1.71 |
| 7 | | −2.212 | ASP | 0.140 | | | | |
| 8 | Lens 4 | −89.928 | ASP | 0.265 | Plastic | 1.671 | 19.5 | −3.56 |
| 9 | | 2.456 | ASP | 0.338 | | | | |
| 10 | Lens 5 | 2.545 | ASP | 0.271 | Plastic | 1.583 | 30.2 | −7.82 |
| 11 | | 1.570 | ASP | 0.244 | | | | |
| 12 | Lens 6 | −3.860 | ASP | 0.616 | Plastic | 1.544 | 55.9 | 1.69 |
| 13 | | −0.785 | ASP | 0.050 | | | | |
| 14 | Lens 7 | 2.116 | ASP | 0.496 | Plastic | 1.544 | 55.9 | −2.95 |
| 15 | | 0.838 | ASP | 0.500 | | | | |
| 16 | Filter | Plano | | 0.210 | Glass | 1.517 | 64.2 | — |
| 17 | | Plano | | 0.402 | | | | |
| 18 | Image Surface | Plano | | — | | | | |

* Reference Wavelength d-line 587.6 nm

TABLE 4

Aspheric Coefficients

| Surface # | 1 | 2 | 3 | 4 | 6 | 7 | 8 |
|---|---|---|---|---|---|---|---|
| k= | −1.7758E+01 | −2.4216E+01 | −1.1069E+00 | −1.3409E+01 | −7.3637E+00 | −4.7512E+00 | −1.0000E+00 |
| A4= | 5.5442E−02 | 1.6535E−01 | −3.8289E−02 | −3.7297E−01 | −1.9290E−02 | 1.2374E−01 | 1.3206E−01 |
| A6= | −8.5067E−02 | −1.6843E−01 | 8.1284E−02 | 6.4187E−01 | 8.4190E−02 | −4.2012E−01 | −5.8325E−01 |
| A8= | 5.1305E−02 | 9.7200E−02 | −3.0480E−01 | −1.1010E+00 | −2.0318E−01 | 4.7848E−01 | 6.7833E−01 |
| A10= | −3.0746E−02 | −5.0648E−02 | 3.1987E−01 | 1.0619E+00 | 1.3640E−01 | −3.0160E−01 | −2.8570E−01 |
| A12= | 1.9379E−02 | 2.4240E−02 | −1.0851E−01 | −4.0892E−01 | −2.8132E−02 | 7.6503E−02 | 1.0296E−03 |
| A14= | −6.7174E−03 | | | | | | 1.8187E−02 |
| A16= | 8.6154E−04 | | | | | | |

| Surface # | 9 | 10 | 11 | 12 | 13 | 14 | 15 |
|---|---|---|---|---|---|---|---|
| k= | 1.8623E+00 | −8.9998E+01 | −3.2699E+01 | 5.7108E+00 | −5.8159E+00 | −1.9110E−01 | −4.0573E+00 |
| A4= | −3.4711E−02 | −1.4845E−01 | −7.9026E−02 | −1.0961E−01 | −4.7490E−01 | 1.3206E−01 | −1.4019E−02 |
| A6= | −1.5149E−01 | −5.8835E−02 | −2.8040E−02 | 8.8041E−01 | 1.2153E+00 | −5.1771E−01 | −8.5115E−02 |
| A8= | 1.4813E−01 | 1.8764E−01 | 4.3641E−03 | −1.7173E+00 | −1.9800E+00 | 4.9528E−01 | 7.7766E−02 |
| A10= | −3.4214E−02 | −1.5702E−01 | −1.1921E−01 | 1.5362E+00 | 1.9587E+00 | −2.6279E−01 | −3.4459E−02 |
| A12= | −7.9573E−03 | 8.8295E−02 | 2.1638E−01 | −5.6055E−01 | −1.1195E+00 | 8.3042E−02 | 8.7314E−03 |
| A14= | | −2.2138E−02 | −1.2322E−01 | −3.8216E−02 | 3.6567E−01 | −1.5443E−02 | −1.2925E−03 |
| A16= | | | 2.3541E−02 | 8.2965E−02 | −6.3894E−02 | 1.5608E−03 | 1.0426E−04 |
| A18= | | | | −1.6666E−02 | 4.6568E−03 | −6.6340E−05 | −3.5429E−06 |

In the 2nd embodiment, the equation of the aspheric surface profiles of the aforementioned lens elements is the same as the equation of the 1st embodiment. Also, the definitions of these parameters shown in table below are the same as those stated in the 1st embodiment with corresponding values for the 2nd embodiment, so an explanation in this regard will not be provided again.

Moreover, these parameters can be calculated from TABLE 3 and TABLE 4 and satisfy the conditions stated in table below.

| 2nd Embodiment | | | |
|---|---|---|---|
| f [mm] | 2.50 | (R5 + R6)/(R5 − R6) | −0.22 |
| Fno. | 1.76 | f/f5 | −0.32 |
| HFOV [deg.] | 52.1 | f2/TL | −3.49 |
| V5 | 30.2 | (f/f1) + (f/f2) | −0.48 |
| Vmin | 19.5 | (f/f3) + (f/f6) | 2.94 |
| V4/V2 | 0.35 | |f/fi|min | 0.13 |
| (Vi/Ni)min | 11.67 | f/EPD | 1.76 |
| ΣAT/ΣCT | 0.50 | TL/f | 2.22 |
| T34/T45 | 0.41 | TL/ImgH | 1.75 |
| T45/T56 | 1.38 | TL/EPD | 3.91 |
| T67/T56 | 0.20 | f/ImgH | 0.79 |
| (T34 + T56 + T67)/T45 | 1.28 | SD/TD | 0.73 |
| f/R8 | 1.02 | BL/EPD | 0.78 |
| f/R10 | 1.59 | Yc52/CT5 | 2.70 |
| R8/R13 | 1.16 | (TL*f)/(ImgH*EPD) | 3.07 |

3rd Embodiment

Figure 3A:
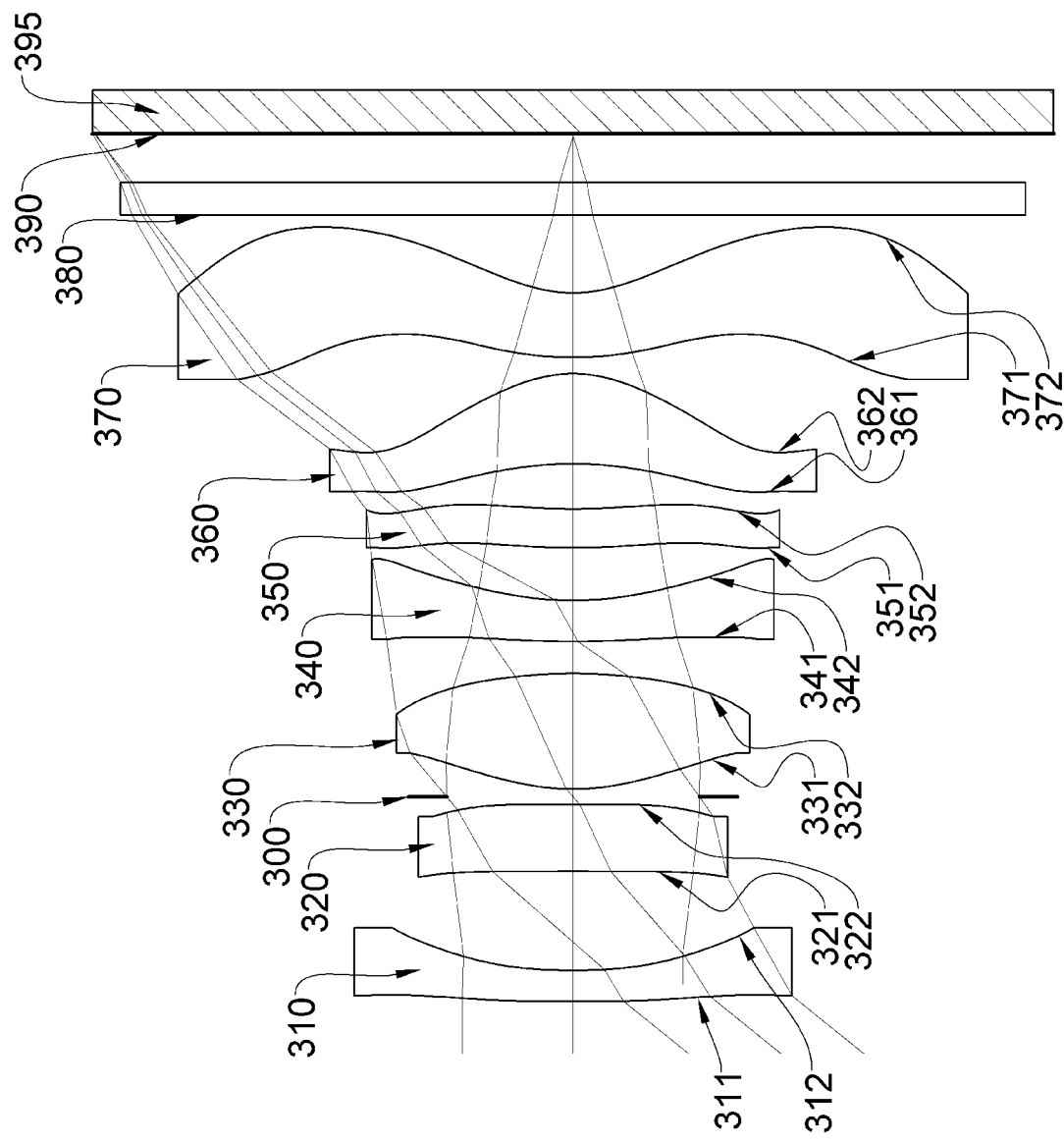
FIG. 3A is a schematic view of an imaging apparatus according to the 3rd embodiment of the present disclosure.
Figure 3B:
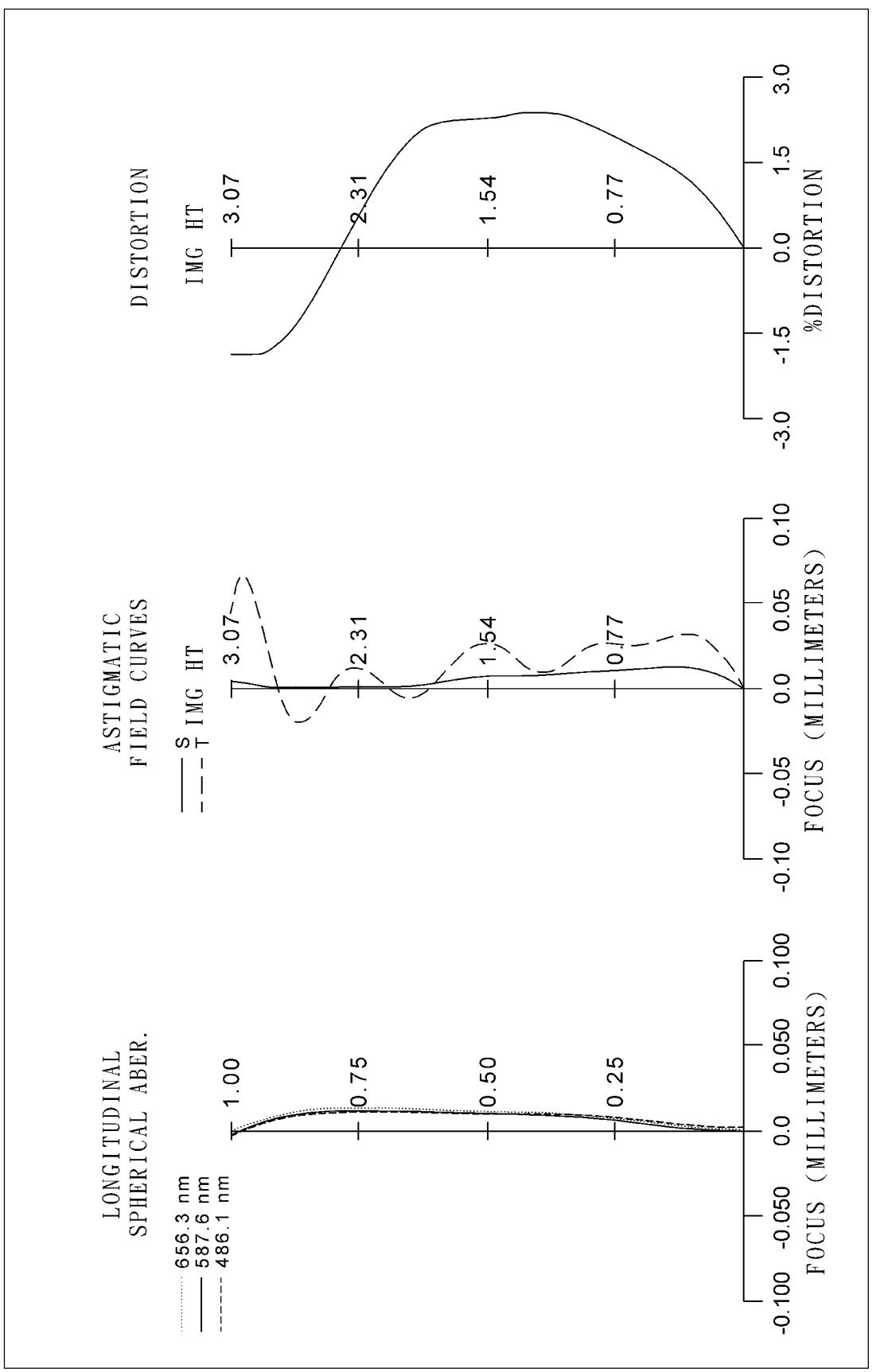
FIG. 3B shows longitudinal spherical aberration curves, astigmatic field curves and a distortion curve of the imaging apparatus according to the 3rd embodiment.

FIG. 3A is a schematic view of an imaging apparatus according to the 3rd embodiment of the present disclosure. FIG. 3B shows, in order from left to right, longitudinal spherical aberration curves, astigmatic field curves and a distortion curve of the imaging apparatus according to the 3rd embodiment.

In FIG. 3A, the imaging apparatus includes a photographing lens system (not otherwise herein labeled) of the present disclosure and an image sensor 395. The photographing lens system includes, in order from an object side to an image side, a first lens element 310, a second lens element 320, an aperture stop 300, a third lens element 330, a fourth lens element 340, a fifth lens element 350, a sixth lens element 360, a seventh lens element 370, and an image surface 390. The image sensor 395 is disposed on or near the image surface 390, and the photographing lens system includes seven lens elements (310, 320, 330, 340, 350, 360 and 370) without any other lens element being inserted between them.

The first lens element 310 has negative refractive power and is made of plastic material. The first lens element 310 has an object-side surface 311 being convex in a paraxial region with at least one inflection point in an off-axis region thereof, and an image-side surface 312 being concave in a paraxial region thereof. Both the object-side surface 311 and the image-side surface 312 are aspheric.

The second lens element 320 has negative refractive power and is made of plastic material. The second lens element 320 has an object-side surface 321 being concave in a paraxial region thereof, and an image-side surface 322 being concave in a paraxial region thereof. Both the object-side surface 321 and the image-side surface 322 are aspheric.

The third lens element 330 has positive refractive power and is made of plastic material. The third lens element 330 has an object-side surface 331 being convex in a paraxial region thereof, and an image-side surface 332 being convex in a paraxial region thereof. Both the object-side surface 331 and the image-side surface 332 are aspheric.

The fourth lens element 340 has negative refractive power and is made of plastic material. The fourth lens element 340 has an object-side surface 341 being convex in a paraxial region thereof, and an image-side surface 342 being concave in a paraxial region thereof. Both the object-side surface 341 and the image-side surface 342 are aspheric.

The fifth lens element 350 has positive refractive power and is made of plastic material. The fifth lens element 350 has an object-side surface 351 being convex in a paraxial region thereof, and an image-side surface 352 being concave in a paraxial region with at least one critical point in an off-axis region thereof. Both the object-side surface 351 and the image-side surface 352 are aspheric.

The sixth lens element 360 has positive refractive power and is made of plastic material. The sixth lens element 360 has an object-side surface 361 being concave in a paraxial region with at least one inflection point in an off-axis region thereof, and an image-side surface 362 being convex in a paraxial region with at least one inflection point in an off-axis region thereof. Both the object-side surface 361 and the image-side surface 362 are aspheric.

The seventh lens element 370 has negative refractive power and is made of plastic material. The seventh lens element 370 has an object-side surface 371 being convex in a paraxial region, and an image-side surface 372 being concave in a paraxial region with at least one inflection point in an off-axis region thereof. Both the object-side surface 371 and the image-side surface 372 are aspheric.

The photographing lens system further includes a filter 380 disposed between the seventh lens element 370 and the image surface 390. The filter 380 is made of glass material and does not affect a focal length of the photographing lens system.

The detailed optical data of the 3rd embodiment are shown in TABLE 5, and the aspheric surface data are shown in TABLE 6.

TABLE 5

(3nd Embodiment)
f = 2.53 mm, Fno = 1.78, HFOV = 51.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 31.450 | ASP | 0.200 | Plastic | 1.535 | 56.3 | −7.88 |
| 2 | | 3.705 | ASP | 0.638 | | | | |
| 3 | Lens 2 | −82.645 | ASP | 0.430 | Plastic | 1.544 | 55.9 | −19.66 |
| 4 | | 12.308 | ASP | 0.050 | | | | |
| 5 | Ape. Stop | Plano | | 0.050 | | | | |
| 6 | Lens 3 | 1.433 | ASP | 0.745 | Plastic | 1.544 | 55.9 | 1.93 |
| 7 | | −3.230 | ASP | 0.207 | | | | |
| 8 | Lens 4 | 7.028 | ASP | 0.265 | Plastic | 1.700 | 18.0 | −4.67 |

TABLE 5-continued (3nd Embodiment)
f = 2.53 mm, Fno = 1.78, HFOV = 51.0 deg.

| Surface # | | Curvature Radius | | Thickness | Material | Index | Abbe # | Focal Length |
|---|---|---|---|---|---|---|---|---|
| 9 | | 2.198 | ASP | 0.338 | | | | |
| 10 | Lens 5 | 3.643 | ASP | 0.251 | Plastic | 1.583 | 30.2 | 136.65 |
| 11 | | 3.720 | ASP | 0.291 | | | | |
| 12 | Lens 6 | −2.469 | ASP | 0.581 | Plastic | 1.544 | 55.9 | 1.99 |
| 13 | | −0.814 | ASP | 0.104 | | | | |
| 14 | Lens 7 | 2.222 | ASP | 0.417 | Plastic | 1.614 | 26.0 | −2.60 |
| 15 | | 0.863 | ASP | 0.500 | | | | |
| 16 | Filter | Plano | | 0.210 | Glass | 1.517 | 64.2 | — |
| 17 | | Plano | | 0.314 | | | | |
| 18 | Image Surface | Plano | | — | | | | |

* Reference Wavelength d-line 587.6 nm

TABLE 6

Aspheric Coefficients

| Surface # | 1 | 2 | 3 | 4 | 6 | 7 | 8 |
|---|---|---|---|---|---|---|---|
| k= | −1.7758E+01 | −2.4207E+01 | −1.1069E+00 | −1.3405E+01 | −6.9151E+00 | −4.7548E+00 | −1.0000E+00 |
| A4= | 9.2976E−02 | 2.0309E−01 | 1.4090E−02 | −2.9834E−01 | −1.6471E−03 | 6.3560E−02 | 3.1097E−02 |
| A6= | −1.0842E−01 | −1.5912E−01 | −3.5959E−02 | 3.9728E−01 | 6.2605E−02 | −1.7191E−01 | −2.3759E−01 |
| A8= | 4.8042E−02 | 5.1184E−02 | −7.0034E−02 | −5.6486E−01 | −1.8106E−01 | 6.2940E−02 | 1.7617E−01 |
| A10= | −1.5291E−02 | −1.1751E−02 | 8.7508E−02 | 4.7432E−01 | 1.6018E−01 | 4.1568E−02 | 4.0688E−02 |
| A12= | 6.9744E−03 | 7.9586E−03 | −2.7532E−02 | −1.6310E−01 | −5.3491E−02 | −3.0820E−02 | −7.1402E−02 |
| A14= | −2.3352E−03 | | | | | | 1.4212E−02 |
| A16 = | 2.8706E−04 | | | | | | |

| Surface # | 9 | 10 | 11 | 12 | 13 | 14 | 15 |
|---|---|---|---|---|---|---|---|
| k= | 1.3490E+00 | −8.9998E+01 | −3.2746E+01 | 1.4333E+00 | −4.6203E+00 | −1.7416E−01 | −3.5272E+00 |
| A4= | −3.3612E−02 | −3.7027E−03 | −1.3712E−01 | −1.8759E−02 | −2.8941E−01 | 6.6093E−02 | −3.9117E−02 |
| A6= | −1.2000E−01 | −1.7133E−01 | 8.8735E−02 | 2.7565E−01 | 6.6958E−01 | −3.5941E−01 | −4.8931E−02 |
| A8= | 1.1075E−01 | 2.5123E−01 | −2.4262E−01 | −4.2638E−01 | −1.1203E+00 | 3.2763E−01 | 4.6729E−02 |
| A10= | −2.9580E−02 | −2.5028E−01 | −1.8060E−01 | 2.6023E−01 | 1.1989E+00 | −1.6286E−01 | −1.9501E−02 |
| A12= | 2.1955E−03 | 1.4960E−01 | 2.6566E−01 | 8.2735E−02 | −7.3890E−01 | 4.8140E−02 | 4.6009E−03 |
| A14= | −3.7900E−03 | −3.4220E−02 | −1.3461E−01 | −1.7558E−01 | 2.6022E−01 | −8.3827E−03 | −6.4072E−04 |
| A16= | | | 2.4087E−02 | 7.7434E−02 | −4.9261E−02 | 7.9453E−04 | 4.9456E−05 |
| A18= | | | | −1.1527E−02 | 3.9110E−03 | −3.1721E−05 | −1.6342E−06 |

In the 3rd embodiment, the equation of the aspheric surface profiles of the aforementioned lens elements is the same as the equation of the 1st embodiment. Also, the definitions of these parameters shown in table below are the same as those stated in the 1st embodiment with corresponding values for the 3rd embodiment, so an explanation in this regard will not be provided again.

Moreover, these parameters can be calculated from TABLE 5 and TABLE 6 and satisfy the conditions stated in table below.

| 3rd Embodiment | | | |
|---|---|---|---|
| f [mm] | 2.53 | (R5 + R6)/(R5 − R6) | −0.39 |
| Fno. | 1.78 | f/f5 | 0.02 |
| HFOV [deg.] | 51.0 | f2/TL | −3.52 |
| V5 | 30.2 | (f/f1) + (f/f2) | −0.45 |
| Vmin | 18.0 | (f/f3) + (f/f6) | 2.59 |
| V4/V2 | 0.32 | \|f/f\|min | 0.02 |
| (Vi/Ni)min | 10.59 | f/EPD | 1.78 |
| ΣAT/ΣCT | 0.58 | TL/f | 2.21 |
| T34/T45 | 0.61 | TL/ImgH | 1.82 |
| T45/T56 | 1.16 | TL/EPD | 3.93 |
| T67/T56 | 0.36 | f/ImgH | 0.82 |
| (T34 + T56 + T67)/T45 | 1.78 | SD/TD | 0.71 |
| f/R8 | 1.15 | BL/EPD | 0.72 |
| f/R10 | 0.68 | Yc52/CT5 | 2.69 |
| R8/R13 | 0.99 | (TL*f)/(ImgH*EPD) | 3.24 |

4th Embodiment

Figure 4A:
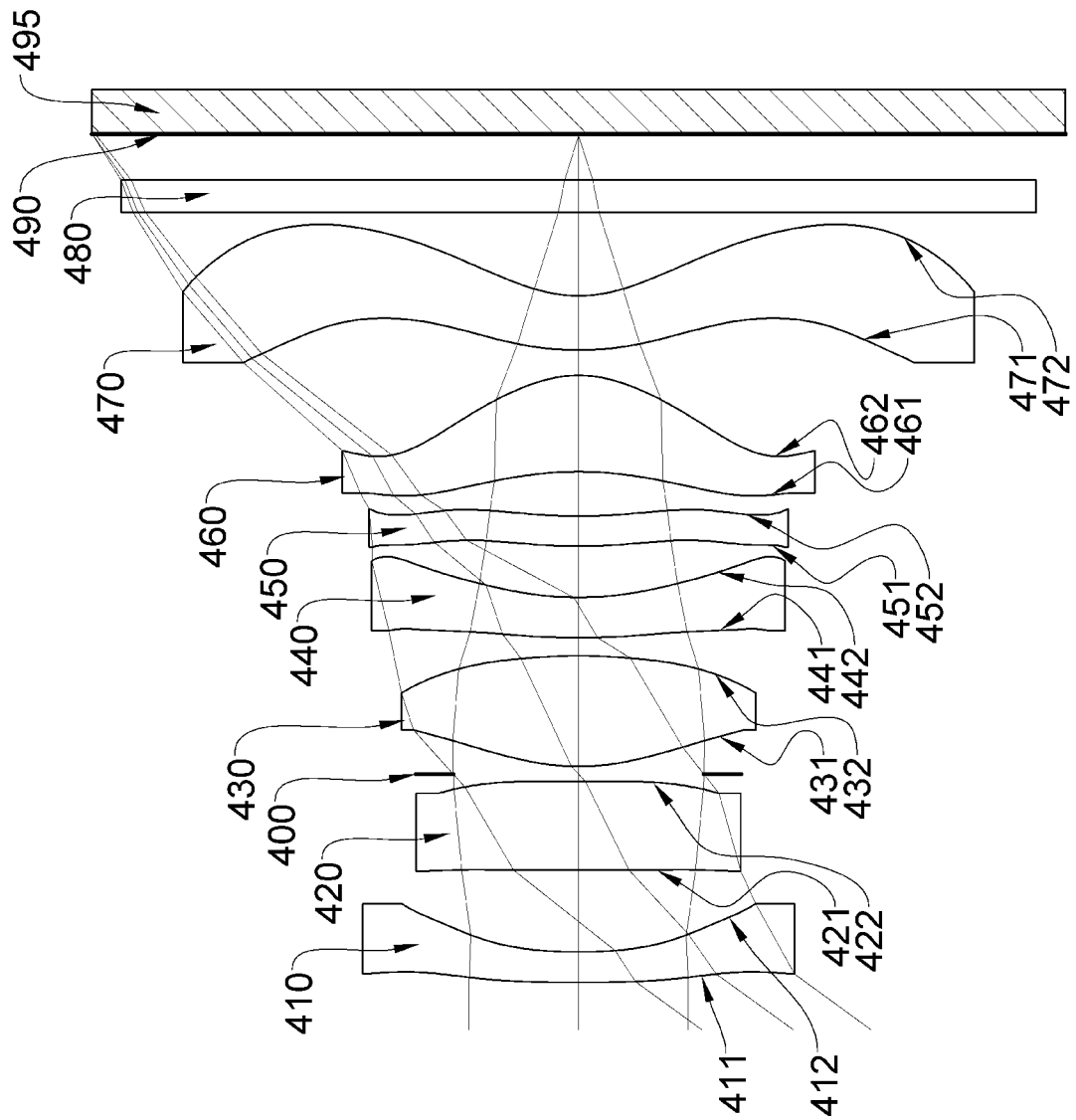
FIG. 4A is a schematic view of an imaging apparatus according to the 4th embodiment of the present disclosure.
Figure 4B:
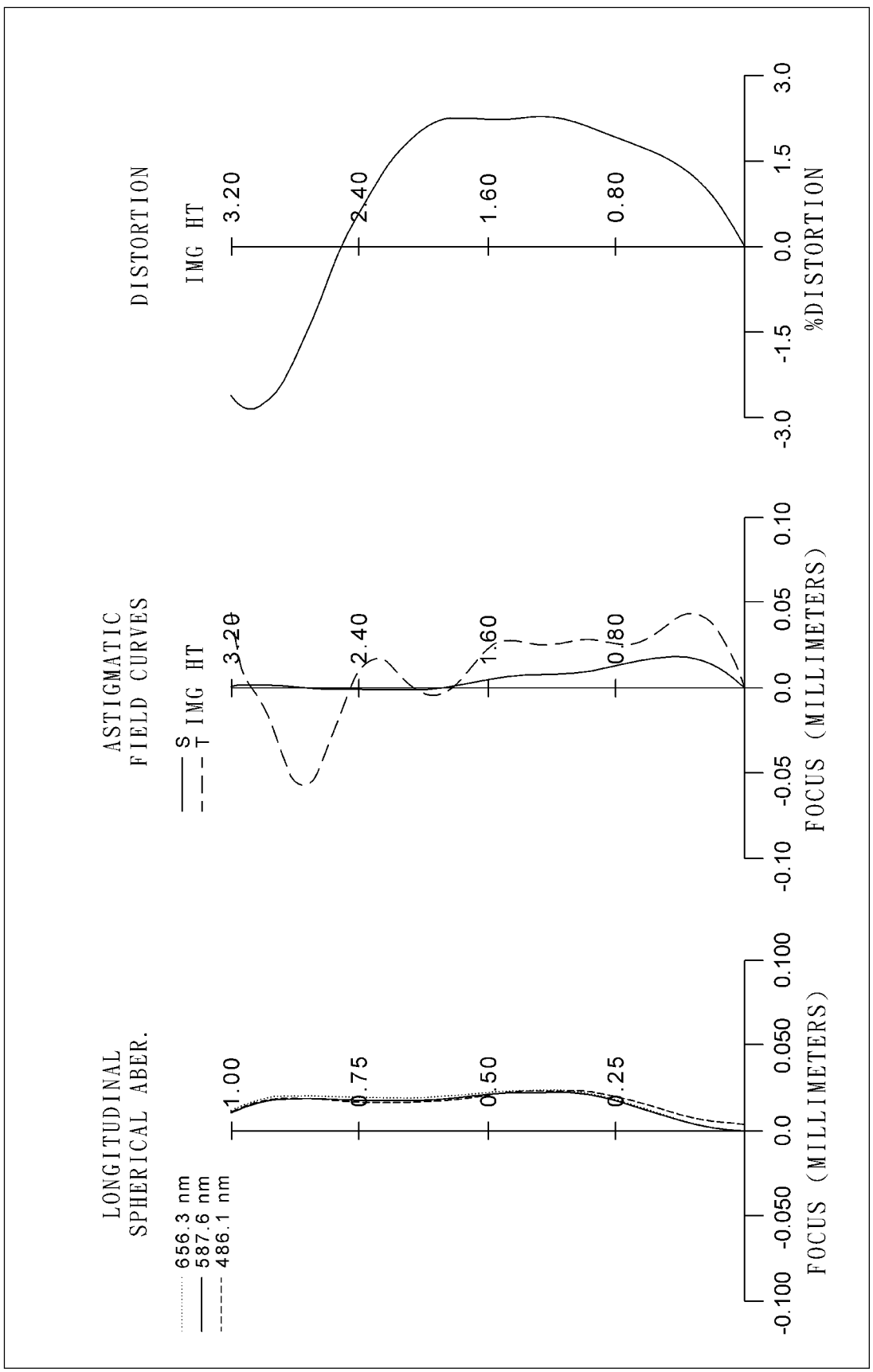
FIG. 4B shows longitudinal spherical aberration curves, astigmatic field curves and a distortion curve of the imaging apparatus according to the 4th embodiment.

FIG. 4A is a schematic view of an imaging apparatus according to the 4th embodiment of the present disclosure. FIG. 4B shows, in order from left to right, longitudinal spherical aberration curves, astigmatic field curves and a distortion curve of the imaging apparatus according to the 4th embodiment.

In FIG. 4A, the imaging apparatus includes a photographing lens system (not otherwise herein labeled) of the present disclosure and an image sensor 495. The photographing lens system includes, in order from an object side to an image side, a first lens element 410, a second lens element 420, an aperture stop 400, a third lens element 430, a fourth lens element 440, a fifth lens element 450, a sixth lens element 460, a seventh lens element 470, and an image surface 490. The image sensor 495 is disposed on or near the image surface 490, and the photographing lens system includes seven lens elements (410, 420, 430, 440, 450, 460 and 470) without any other lens element being inserted between them.

The first lens element 410 has negative refractive power and is made of plastic material. The first lens element 410 has an object-side surface 411 being convex in a paraxial region with at least one inflection point in an off-axis region thereof, and an image-side surface 412 being concave in a paraxial region thereof. Both the object-side surface 411 and the image-side surface 412 are aspheric.

The second lens element 420 has negative refractive power and is made of plastic material. The second lens element 420 has an object-side surface 421 being concave in a paraxial region thereof, and an image-side surface 422 being concave in a paraxial region thereof. Both the object-side surface 421 and the image-side surface 422 are aspheric.

The third lens element 430 has positive refractive power and is made of plastic material. The third lens element 430 has an object-side surface 431 being convex in a paraxial region thereof, and an image-side surface 432 being convex in a paraxial region thereof. Both the object-side surface 431 and the image-side surface 432 are aspheric.

The fourth lens element 440 has negative refractive power and is made of plastic material. The fourth lens element 440 has an object-side surface 441 being convex in a paraxial region thereof, and an image-side surface 442 being concave in a paraxial region thereof. Both the object-side surface 441 and the image-side surface 442 are aspheric.

The fifth lens element 450 has positive refractive power and is made of plastic material. The fifth lens element 450 has an object-side surface 451 being convex in a paraxial region thereof, and an image-side surface 452 being concave in a paraxial region with at least one critical point in an off-axis region thereof. Both the object-side surface 451 and the image-side surface 452 are aspheric.

The sixth lens element 460 has positive refractive power and is made of plastic material. The sixth lens element 460 has an object-side surface 461 being concave in a paraxial region with at least one inflection point in an off-axis region thereof, and an image-side surface 462 being convex in a paraxial region with at least one inflection point in an off-axis region thereof. Both the object-side surface 461 and the image-side surface 462 are aspheric.

The seventh lens element 470 has negative refractive power and is made of plastic material. The seventh lens element 470 has an object-side surface 471 being convex in a paraxial region, and an image-side surface 472 being concave in a paraxial region with at least one inflection point in an off-axis region thereof. Both the object-side surface 471 and the image-side surface 472 are aspheric.

The photographing lens system further includes a filter 480 disposed between the seventh lens element 470 and the image surface 490. The filter 480 is made of glass material and does not affect a focal length of the photographing lens system.

The detailed optical data of the 3rd embodiment are shown in TABLE 7, and the aspheric surface data are shown in TABLE 8.

TABLE 7

(4th Embodiment)
f = 2.37 mm, Fno = 1.65, HFOV = 54.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 30.490 | ASP | 0.200 | Plastic | 1.535 | 56.3 | −7.46 |
| 2 | | 3.519 | ASP | 0.539 | | | | |
| 3 | Lens 2 | −99.487 | ASP | 0.580 | Plastic | 1.544 | 55.9 | −17.87 |
| 4 | | 10.800 | ASP | 0.050 | | | | |
| 5 | Ape. Stop | Plano | | 0.050 | | | | |
| 6 | Lens 3 | 1.404 | ASP | 0.728 | Plastic | 1.544 | 55.9 | 1.95 |
| 7 | | −3.550 | ASP | 0.120 | | | | |
| 8 | Lens 4 | 5.387 | ASP | 0.265 | Plastic | 1.710 | 17.8 | −5.13 |
| 9 | | 2.128 | ASP | 0.336 | | | | |
| 10 | Lens 5 | 2.888 | ASP | 0.198 | Plastic | 1.514 | 56.8 | 481.62 |
| 11 | | 2.854 | ASP | 0.292 | | | | |
| 12 | Lens 6 | −2.517 | ASP | 0.634 | Plastic | 1.544 | 55.9 | 1.81 |
| 13 | | −0.771 | ASP | 0.167 | | | | |
| 14 | Lens 7 | 2.106 | ASP | 0.356 | Plastic | 1.650 | 21.5 | −2.51 |
| 15 | | 0.859 | ASP | 0.550 | | | | |
| 16 | Filter | Plano | | 0.210 | Glass | 1.517 | 64.2 | — |
| 17 | | Plano | | 0.304 | | | | |
| 18 | Image Surface | Plano | | — | | | | |

* Reference Wavelength d-line 587.6 nm

TABLE 8

Aspheric Coefficients

| Surface# | 1 | 2 | 3 | 4 | 6 | 7 | 8 |
|---|---|---|---|---|---|---|---|
| k= | −1.7758E+01 | −2.4207E+01 | −1.1069E+00 | −1.3405E+01 | −7.5364E+00 | −4.7477E+00 | −1.0004E+00 |
| A4= | 1.5568E−01 | 2.8963E−01 | 2.0837E−02 | −3.3821E−01 | −1.3109E−03 | 1.4448E−01 | 1.0252E−01 |
| A6= | −1.3548E−01 | −1.3935E−01 | 4.0542E−02 | 4.8904E−01 | 4.5106E−02 | −4.6206E−01 | −5.2714E−01 |
| A8= | 2.4891E−02 | −6.8968E−02 | −1.7227E−01 | −6.2021E−01 | −1.3740E−01 | 5.0343E−01 | 6.8535E−01 |
| A10= | −4.0331E−03 | 3.4266E−02 | 1.3706E−01 | 4.6836E−01 | 1.0734E−01 | −2.7300E−01 | −3.9788E−01 |
| A12= | 1.0901E−02 | 1.2520E−02 | −2.8905E−02 | −1.4417E−01 | −2.6330E−02 | 5.8998E−02 | 1.0938E−01 |

TABLE 8-continued

Aspheric Coefficients

| | | | | | | | |
|---|---|---|---|---|---|---|---|
| A14= | −5.0645E−03 | | | | | | −1.3697E−02 |
| A16= | 6.4202E−04 | | | | | | |

| Surface # | 9 | 10 | 11 | 12 | 13 | 14 | 15 |
|---|---|---|---|---|---|---|---|
| k= | 1.1402E+00 | −8.9998E+01 | −3.2746E+01 | 1.4376E+00 | −4.0997E+00 | −2.5471E−01 | −3.7750E+00 |
| A4= | −2.3843E−02 | 6.4134E−02 | −1.4920E−01 | −2.8089E−02 | −2.7424E−01 | 8.5762E−02 | 9.5600E−03 |
| A6= | −2.0800E−01 | −3.4488E−01 | 3.4829E−01 | 2.9354E−01 | 6.0520E−01 | −3.3594E−01 | −9.6925E−02 |
| A8= | 2.7295E−01 | 3.3842E−01 | −7.9602E−01 | −3.8615E−01 | −1.0466E+00 | 2.9214E−01 | 7.5269E−02 |
| A10= | −1.5048E−01 | −1.5260E−01 | 8.7488E−01 | 2.3118E−01 | 1.2193E+00 | −1.4203E−01 | −2.9994E−02 |
| A12= | 3.6969E−02 | 4.5812E−02 | −4.8250E−01 | 3.1880E−02 | −8.2949E−01 | 4.1540E−02 | 6.9647E−03 |
| A14= | −5.6930E−03 | −8.7935E−03 | 1.3375E−01 | −1.1233E−01 | 3.2522E−01 | −7.2553E−03 | −9.5349E−04 |
| A16= | | | −1.4814E−02 | 5.2445E−02 | −6.8768E−02 | 6.9978E−04 | 7.1511E−05 |
| A18= | | | | −8.0973E−03 | 6.0829E−03 | −2.8822E−05 | −2.2693E−06 |

In the 4th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 4th embodiment, so an explanation in this regard will not be provided again.

Moreover, these parameters can be calculated from TABLE 7 and TABLE 8 and satisfy the conditions stated in table below.

| 4th Embodiment | | | |
|---|---|---|---|
| f [mm] | 2.37 | (R5 + R6)/(R5 − R6) | −0.43 |
| Fno. | 1.65 | f/f5 | 0.00 |
| HFOV [deg.] | 54.0 | f2/TL | −3.20 |
| V5 | 56.8 | (f/f1) + (f/f2) | −0.45 |
| Vmin | 17.8 | (f/f3) + (f/f6) | 2.53 |
| V4/V2 | 0.32 | \|f/fi\|min | 0.00 |
| (Vi/Ni)min | 10.41 | f/EPD | 1.65 |
| ΣAT/ΣCT | 0.52 | TL/f | 2.35 |
| T34/T45 | 0.36 | TL/ImgH | 1.75 |
| T45/T56 | 1.15 | TL/EPD | 3.88 |
| T67/T56 | 0.57 | f/ImgH | 0.74 |
| (T34 + T56 + T67)/T45 | 1.72 | SD/TD | 0.70 |
| f/R8 | 1.12 | BL/EPD | 0.74 |
| f/R10 | 0.83 | Yc52/CT5 | 3.73 |
| R8/R13 | 1.01 | (TL*f)/(ImgH*EPD) | 2.88 |

5th Embodiment

Figure 5A:
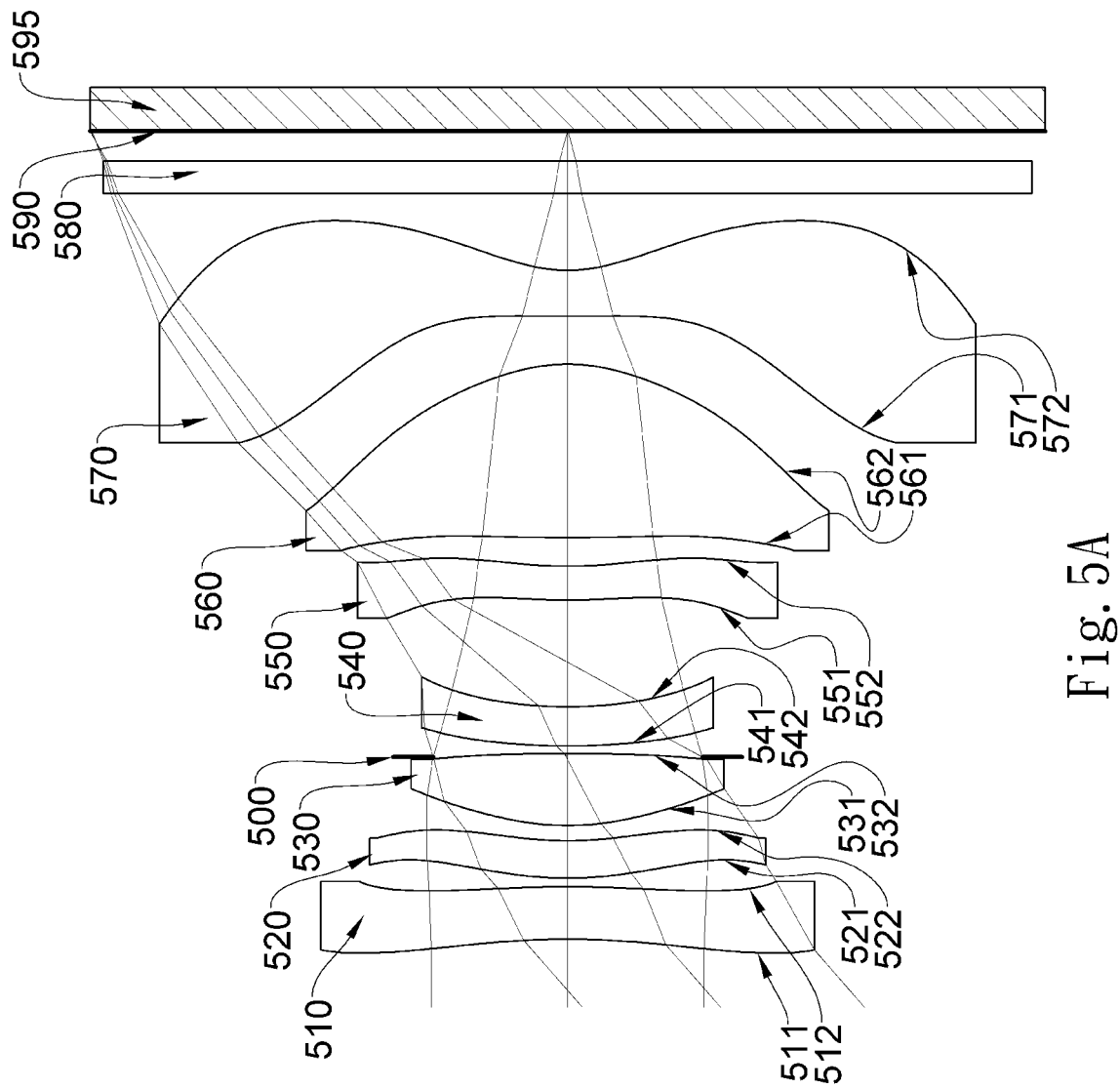
FIG. 5A is a schematic view of an imaging apparatus according to the 5th embodiment of the present disclosure.
Figure 5B:
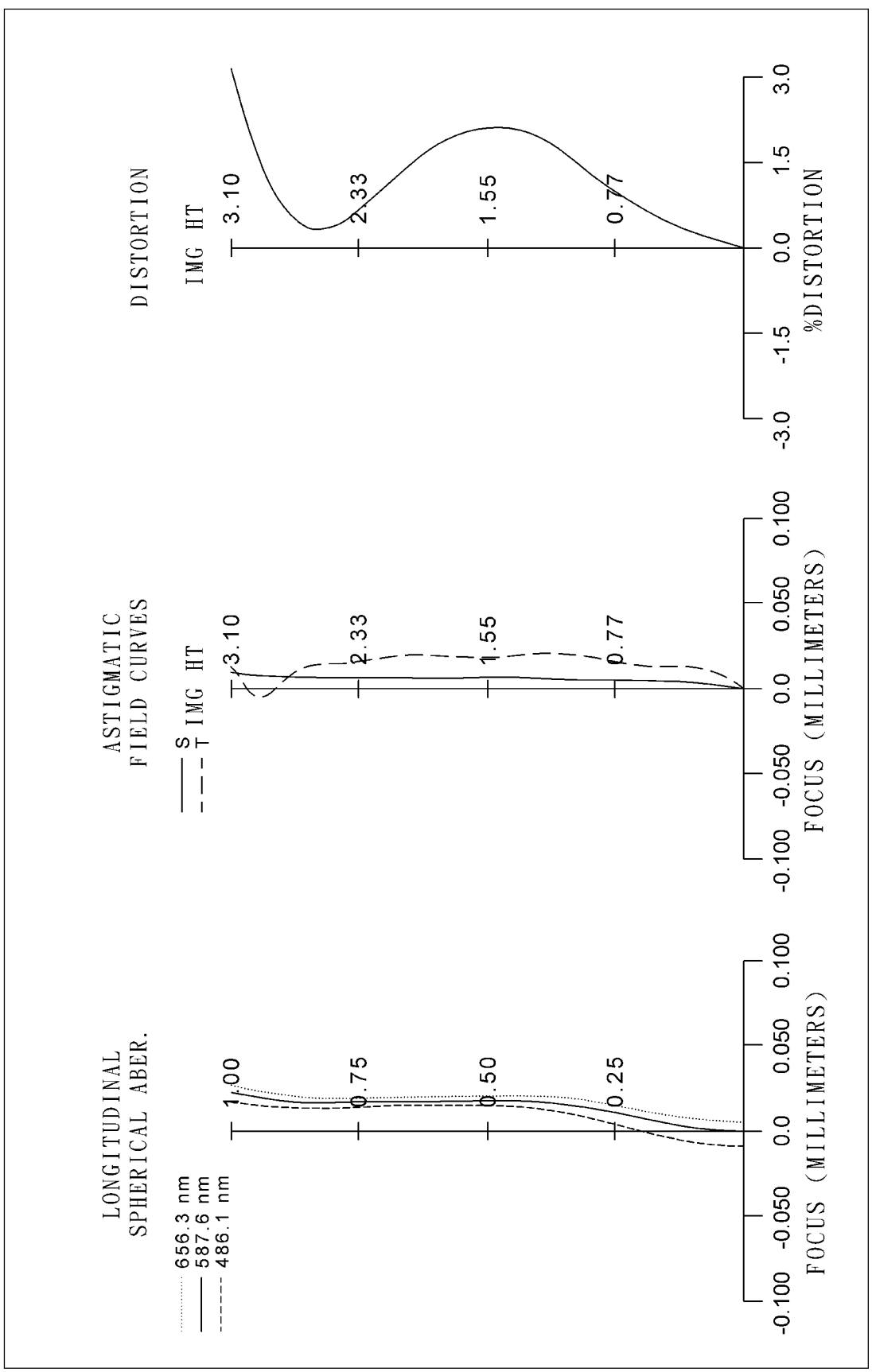
FIG. 5B shows longitudinal spherical aberration curves, astigmatic field curves and a distortion curve of the imaging apparatus according to the 5th embodiment.

FIG. 5A is a schematic view of an imaging apparatus according to the 5th embodiment of the present disclosure. FIG. 5B shows, in order from left to right, longitudinal spherical aberration curves, astigmatic field curves and a distortion curve of the imaging apparatus according to the 5th embodiment.

In FIG. 5A, the imaging apparatus includes a photographing lens system (not otherwise herein labeled) of the present disclosure and an image sensor 595. The photographing lens system includes, in order from an object side to an image side, a first lens element 510, a second lens element 520, a third lens element 530, an aperture stop 500, a fourth lens element 540, a fifth lens element 550, a sixth lens element 560, a seventh lens element 570, and an image surface 590. The image sensor 595 is disposed on or near the image surface 590, and the photographing lens system includes seven lens elements (510, 520, 530, 540, 550, 560 and 570) without any other lens element being inserted between them.

The first lens element 510 has negative refractive power and is made of plastic material. The first lens element 510 has an object-side surface 511 being concave in a paraxial region with at least one inflection point in an off-axis region thereof, and an image-side surface 512 being convex in a paraxial region with at least one inflection point in an off-axis region thereof. Both the object-side surface 511 and the image-side surface 512 are aspheric.

The second lens element 520 has negative refractive power and is made of plastic material. The second lens element 520 has an object-side surface 521 being convex in a paraxial region thereof, and an image-side surface 522 being concave in a paraxial region thereof. Both the object-side surface 521 and the image-side surface 522 are aspheric.

The third lens element 530 has positive refractive power and is made of plastic material. The third lens element 530 has an object-side surface 531 being convex in a paraxial region thereof, and an image-side surface 532 being convex in a paraxial region thereof. Both the object-side surface 531 and the image-side surface 532 are aspheric.

The fourth lens element 540 has negative refractive power and is made of plastic material. The fourth lens element 540 has an object-side surface 541 being convex in a paraxial region thereof, and an image-side surface 542 being concave in a paraxial region thereof. Both the object-side surface 541 and the image-side surface 542 are aspheric.

The fifth lens element 550 has negative refractive power and is made of plastic material. The fifth lens element 550 has an object-side surface 551 being convex in a paraxial region thereof, and an image-side surface 552 being concave in a paraxial region with at least one critical point in an off-axis region thereof. Both the object-side surface 551 and the image-side surface 552 are aspheric.

The sixth lens element 560 has positive refractive power and is made of plastic material. The sixth lens element 560 has an object-side surface 561 being convex in a paraxial region with at least one inflection point in an off-axis region thereof, and an image-side surface 562 being convex in a paraxial region with at least one inflection point in an off-axis region thereof. Both the object-side surface 561 and the image-side surface 562 are aspheric.

The seventh lens element 570 has negative refractive power and is made of plastic material. The seventh lens element 570 has an object-side surface 571 being convex in a paraxial region, and an image-side surface 572 being concave in a paraxial region with at least one inflection point in an off-axis region thereof. Both the object-side surface 571 and the image-side surface 572 are aspheric.

The photographing lens system further includes a filter 580 disposed between the seventh lens element 570 and the image surface 590. The filter 580 is made of glass material and does not affect a focal length of the photographing lens system.

The detailed optical data of the 5th embodiment are shown in TABLE 9, and the aspheric surface data are shown in TABLE 10.

TABLE 9

(5th Embodiment)
f = 3.43 mm, Fno = 1.93, HFOV = 41.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −4.779 | ASP | 0.340 | Plastic | 1.583 | 30.2 | −22.06 |
| 2 | | −7.800 | ASP | 0.057 | | | | |
| 3 | Lens 2 | 2.320 | ASP | 0.243 | Plastic | 1.544 | 55.9 | −171.30 |
| 4 | | 2.180 | ASP | 0.099 | | | | |
| 5 | Lens 3 | 1.679 | ASP | 0.467 | Plastic | 1.544 | 55.9 | 2.96 |
| 6 | | −35.284 | ASP | −0.020 | | | | |
| 7 | Ape. Stop | Plano | | 0.070 | | | | |
| 8 | Lens 4 | 3.941 | ASP | 0.255 | Plastic | 1.671 | 19.5 | −14.88 |
| 9 | | 2.752 | ASP | 0.695 | | | | |
| 10 | Lens 5 | 4.347 | ASP | 0.220 | Plastic | 1.671 | 19.5 | −10.44 |
| 11 | | 2.628 | ASP | 0.187 | | | | |
| 12 | Lens 6 | 18.072 | ASP | 1.129 | Plastic | 1.544 | 55.9 | 1.98 |
| 13 | | −1.118 | ASP | 0.310 | | | | |
| 14 | Lens 7 | 16.886 | ASP | 0.300 | Plastic | 1.534 | 55.9 | −1.88 |
| 15 | | 0.940 | ASP | 0.500 | | | | |
| 16 | Filter | Plano | | 0.210 | Glass | 1.517 | 64.2 | — |
| 17 | | Plano | | 0.197 | | | | |
| 18 | Image Surface | Plano | | — | | | | |

\* Reference Wavelength d-line 587.6 nm

TABLE 10

Aspheric Coefficients

| Surface # | 1 | 2 | 3 | 4 | 5 | 6 | 8 |
|---|---|---|---|---|---|---|---|
| k= | −4.4464E+01 | −7.7623E+01 | −4.6754E+00 | −6.8719E+00 | −6.9168E+00 | −3.9691E+01 | −3.8024E+00 |
| A4= | −1.2469E−02 | 5.7187E−03 | −8.0982E−02 | −1.9008E−01 | 2.4349E−02 | −1.0053E−01 | −8.4005E−02 |
| A6= | 2.6575E−02 | 4.3263E−02 | 6.7959E−02 | 1.1105E−01 | −6.8251E−02 | 1.6279E−01 | 2.2209E−01 |
| A8= | −1.3336E−02 | −3.9427E−02 | −9.1745E−02 | −4.7914E−02 | 1.0552E−01 | −1.7288E−01 | −1.7403E−01 |
| A10= | 3.5449E−03 | 2.4102E−02 | 4.0566E−02 | 3.4801E−03 | −3.8767E−02 | 1.1770E−01 | 5.7120E−02 |
| A12= | −3.4366E−04 | −9.6315E−03 | −5.1001E−03 | 3.0385E−03 | −6.0249E−03 | −4.4887E−02 | 5.8007E−03 |
| A14= | | 2.0545E−03 | | | | | −1.1244E−02 |

| Surface# | 9 | 10 | 11 | 12 | 13 | 14 | 15 |
|---|---|---|---|---|---|---|---|
| k= | 4.2835E+00 | −3.8583E+01 | −2.1011E+01 | 1.4223E+01 | −5.5108E+00 | 4.1697E+01 | −4.4125E+00 |
| A4= | −4.1141E−02 | −1.9398E−01 | −9.9299E−02 | 6.8418E−04 | −7.9251E−02 | −1.1998E−01 | −9.9606E−02 |
| A6= | 3.6396E−02 | 1.0133E−01 | −2.2673E−02 | −4.5086E−02 | 2.4092E−02 | −8.5582E−02 | 3.4494E−02 |
| A8= | 8.1862E−02 | −6.1996E−02 | 9.9235E−02 | −5.6163E−02 | −2.2726E−02 | 9.2781E−02 | −7.2752E−03 |
| A10= | −2.0152E−01 | −2.1429E−02 | −1.2628E−01 | 4.0304E−02 | 1.1979E−02 | −3.5283E−02 | 7.2846E−04 |
| A12= | 1.7690E−01 | 5.8689E−02 | 9.3645E−02 | −2.8999E−02 | −2.3667E−03 | 6.9922E−03 | −1.1779E−05 |
| A14= | −6.3541E−02 | −2.0708E−02 | −3.3429E−02 | 9.5709E−03 | 1.1693E−04 | −7.1758E−04 | −4.2658E−06 |
| A16= | | | 4.4341E−03 | −1.3093E−03 | 1.4083E−05 | 3.0045E−05 | 2.8678E−07 |

In the 5th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 5th embodiment, so an explanation in this regard will not be provided again.

Moreover, these parameters can be calculated from TABLE 9 and TABLE 10 and satisfy the conditions stated in table below.

| 5th Embodiment | | | |
|---|---|---|---|
| f [mm] | 3.43 | (R5 + R6)/(R5 − R6) | −0.91 |
| Fno. | 1.93 | f/f5 | −0.33 |
| HFOV [deg.] | 41.2 | f2/TL | −32.57 |
| V5 | 19.5 | (f/f1) + (f/f2) | −0.18 |
| Vmin | 19.5 | (f/f3) + (f/f6) | 2.89 |
| V4/V2 | 0.35 | |f/fi|min | 0.02 |

| 5th Embodiment | | | |
|---|---|---|---|
| (Vi/Ni)min | 11.67 | f/EPD | 1.93 |
| ΣAT/ΣCT | 0.47 | TL/f | 1.54 |
| T34/T45 | 0.07 | TL/ImgH | 1.70 |
| T45/T56 | 3.72 | TL/EPD | 2.96 |
| T67/T56 | 1.66 | f/ImgH | 1.11 |
| (T34 + T56 + T67)/T45 | 0.79 | SD/TD | 0.73 |
| f/R8 | 1.25 | BL/EPD | 0.51 |
| f/R10 | 1.30 | Yc52/CT5 | 3.66 |
| R8/R13 | 0.16 | (TL\*f)/(ImgH\*EPD) | 3.27 |

6th Embodiment

Figure 6A:
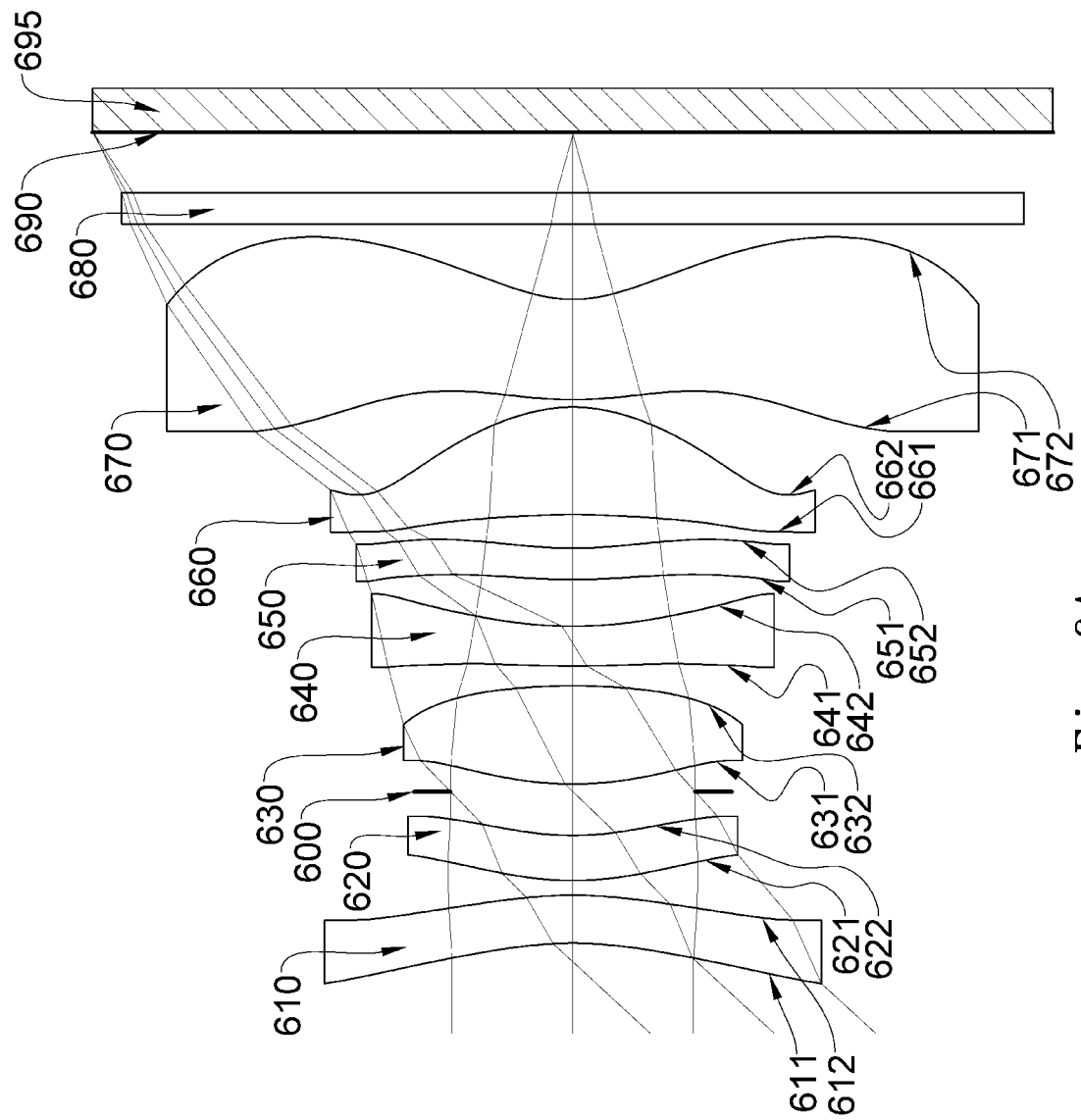
FIG. 6A is a schematic view of an imaging apparatus according to the 6th embodiment of the present disclosure.
Figure 6B:
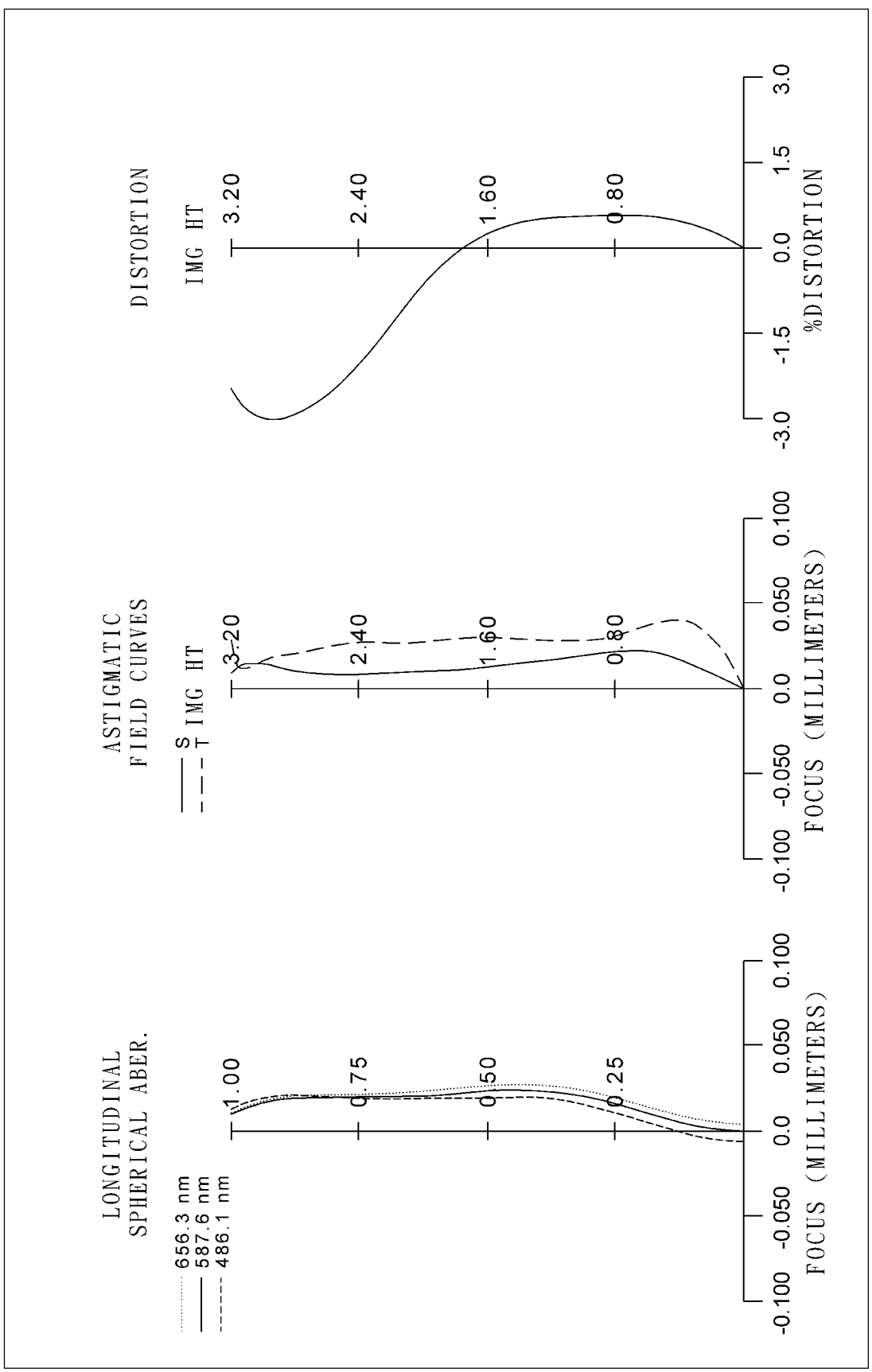
FIG. 6B shows longitudinal spherical aberration curves, astigmatic field curves and a distortion curve of the imaging apparatus according to the 6th embodiment.

FIG. 6A is a schematic view of an imaging apparatus according to the 6th embodiment of the present disclosure. FIG. 6B shows, in order from left to right, longitudinal spherical aberration curves, astigmatic field curves and a distortion curve of the imaging apparatus according to the 6th embodiment.

In FIG. 6A, the imaging apparatus includes a photographing lens system (not otherwise herein labeled) of the present disclosure and an image sensor 695. The photographing lens system includes, in order from an object side to an image side, a first lens element 610, a second lens element 620, an aperture stop 600, a third lens element 630, a fourth lens element 640, a fifth lens element 650, a sixth lens element 660, a seventh lens element 670, and an image surface 690. The image sensor 695 is disposed on or near the image surface 690, and the photographing lens system includes seven lens elements (610, 620, 630, 640, 650, 660 and 670) without any other lens element being inserted between them.

The first lens element 610 has negative refractive power and is made of plastic material. The first lens element 610 has an object-side surface 611 being concave in a paraxial region with at least one inflection point in an off-axis region thereof, and an image-side surface 612 being convex in a paraxial region with at least one inflection point in an off-axis region thereof. Both the object-side surface 611 and the image-side surface 612 are aspheric.

The second lens element 620 has negative refractive power and is made of plastic material. The second lens element 620 has an object-side surface 621 being convex in a paraxial region thereof, and an image-side surface 622 being concave in a paraxial region thereof. Both the object-side surface 621 and the image-side surface 622 are aspheric.

The third lens element 630 has positive refractive power and is made of plastic material. The third lens element 630 has an object-side surface 631 being convex in a paraxial region thereof, and an image-side surface 632 being convex in a paraxial region thereof. Both the object-side surface 631 and the image-side surface 632 are aspheric.

The fourth lens element 640 has negative refractive power and is made of plastic material. The fourth lens element 640 has an object-side surface 641 being convex in a paraxial region thereof, and an image-side surface 642 being concave in a paraxial region thereof. Both the object-side surface 641 and the image-side surface 642 are aspheric.

The fifth lens element 650 has negative refractive power and is made of plastic material. The fifth lens element 650 has an object-side surface 651 being convex in a paraxial region thereof, and an image-side surface 652 being concave in a paraxial region with at least one critical point in an off-axis region thereof. Both the object-side surface 651 and the image-side surface 652 are aspheric.

The sixth lens element 660 has positive refractive power and is made of plastic material. The sixth lens element 660 has an object-side surface 661 being concave in a paraxial region with at least one inflection point in an off-axis region thereof, and an image-side surface 662 being convex in a paraxial region with at least one inflection point in an off-axis region thereof. Both the object-side surface 661 and the image-side surface 662 are aspheric.

The seventh lens element 670 has negative refractive power and is made of plastic material. The seventh lens element 670 has an object-side surface 671 being convex in a paraxial region, and an image-side surface 672 being concave in a paraxial region with at least one inflection point in an off-axis region thereof. Both the object-side surface 671 and the image-side surface 672 are aspheric.

The photographing lens system further includes a filter 680 disposed between the seventh lens element 670 and the image surface 690. The filter 680 is made of glass material and does not affect a focal length of the photographing lens system.

The detailed optical data of the 6th embodiment are shown in TABLE 11, and the aspheric surface data are shown in TABLE 12.

TABLE 11

(6th Embodiment)
f = 3.02 mm, Fno = 1.88, HFOV = 47.3 deg.

| Surface# | | Curvature Radius | | Thickness | Material | Index | Abbe# | Focal Length |
|---|---|---|---|---|---|---|---|---|
| 0 | Object | Plano | | Infinity | | | | |
| 1 | Lens 1 | −2.476 | ASP | 0.320 | Plastic | 1.544 | 55.9 | −100.59 |
| 2 | | −2.711 | ASP | 0.097 | | | | |
| 3 | Lens 2 | 1.985 | ASP | 0.300 | Plastic | 1.544 | 55.9 | −120.71 |
| 4 | | 1.824 | ASP | 0.293 | | | | |
| 5 | Ape. Stop | Plano | | 0.050 | | | | |
| 6 | Lens 3 | 2.244 | ASP | 0.654 | Plastic | 1.544 | 55.9 | 2.83 |
| 7 | | −4.388 | ASP | 0.132 | | | | |
| 8 | Lens 4 | 9.621 | ASP | 0.265 | Plastic | 1.671 | 19.5 | −6.45 |
| 9 | | 2.953 | ASP | 0.310 | | | | |
| 10 | Lens 5 | 3.409 | ASP | 0.209 | Plastic | 1.660 | 20.3 | −19.53 |
| 11 | | 2.630 | ASP | 0.223 | | | | |
| 12 | Lens 6 | −5.069 | ASP | 0.716 | Plastic | 1.544 | 55.9 | 2.33 |
| 13 | | −1.066 | ASP | 0.050 | | | | |
| 14 | Lens 7 | 2.526 | ASP | 0.667 | Plastic | 1.544 | 55.9 | −2.91 |
| 15 | | 0.883 | ASP | 0.500 | | | | |
| 16 | Filter | Plano | | 0.210 | Glass | 1.517 | 64.2 | — |
| 17 | | Plano | | 0.403 | | | | |
| 18 | Image Surface | Plano | | — | | | | |

\* Reference Wavelength d-line 587.6 nm

TABLE 12

| | Aspheric Coefficients | | | | | | |
|---|---|---|---|---|---|---|---|
| Surface # | 1 | 2 | 3 | 4 | 6 | 7 | 8 |
| k= | −1.7801E+01 | −2.4662E+01 | −3.5604E+00 | −6.9643E+00 | −6.0601E+00 | −1.3705E+01 | −1.0000E+00 |
| A4= | −1.4894E−03 | 8.5482E−03 | −7.9627E−02 | −1.0553E−01 | 1.9943E−02 | 1.9415E−03 | 3.3842E−02 |
| A6= | 3.7834E−03 | −1.1392E−03 | 7.4247E−03 | 3.3125E−02 | −5.0441E−02 | −1.7120E−01 | −2.7178E−01 |
| A8= | −3.2783E−03 | −8.7453E−04 | 1.7462E−02 | 3.4966E−03 | 9.4444E−02 | 1.6548E−01 | 2.5827E−01 |
| A10= | 1.2243E−03 | 7.1662E−04 | −8.3274E−03 | −5.8439E−03 | −8.4425E−03 | −6.5865E−02 | −3.0633E−02 |
| A12= | −1.3407E−04 | | −8.5517E−12 | 4.3383E−07 | −3.2444E−12 | 5.0748E−06 | −5.2418E−02 |
| A14= | | | | | | | 1.6237E−02 |

| Surface # | 9 | 10 | 11 | 12 | 13 | 14 | 15 |
|---|---|---|---|---|---|---|---|
| k= | 3.1588E+00 | −8.9998E+01 | −3.2699E+01 | 7.5073E+00 | −5.5321E+00 | 7.4968E−02 | −4.3068E+00 |
| A4= | 5.4212E−03 | −4.7618E−02 | −6.3021E−02 | 1.3703E−01 | −2.2625E−01 | −2.1985E−01 | −7.9054E−02 |
| A6= | −1.4195E−01 | −4.0280E−02 | 3.5819E−03 | −2.2120E−01 | 2.9573E−01 | 7.1714E−02 | 3.2280E−02 |
| A8= | 1.2994E−01 | 7.4295E−02 | −5.8601E−03 | 1.9158E−01 | −3.1128E−01 | −1.3133E−01 | −9.5154E−03 |
| A10= | −4.3393E−02 | −3.8691E−02 | 1.5612E−02 | −9.8806E−02 | 2.0455E−01 | 1.2362E−03 | 1.7146E−03 |
| A12= | 1.1532E−03 | 6.5627E−03 | −8.7926E−03 | 3.1635E−02 | −6.7730E−02 | −2.3888E−05 | −1.8240E−04 |
| A14= | | | 1.7512E−03 | −4.2072E−03 | 1.0605E−02 | −5.0549E−06 | 1.0302E−05 |
| A16= | | | | −1.2997E−04 | −6.4042E−04 | | −2.3863E−07 |

In the 6th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 6th embodiment, so an explanation in this regard will not be provided again.

Moreover, these parameters can be calculated from TABLE 11 and TABLE 12 and satisfy the conditions stated in table below.

| 6th Embodiment | | | |
|---|---|---|---|
| f [mm] | 3.02 | (R5 + R6)/(R5 − R6) | −0.32 |
| Fno. | 1.88 | f/f5 | −0.15 |
| HFOV [deg.] | 47.3 | f2/TL | −22.35 |
| V5 | 20.3 | (f/f1) + (f/f2) | −0.06 |
| Vmin | 19.5 | (f/f3) + (f/f6) | 2.36 |
| V4/V2 | 0.35 | |f/f|min | 0.03 |
| (Vi/Ni)min | 11.67 | f/EPD | 1.88 |
| ΣAT/ΣCT | 0.37 | TL/f | 1.79 |
| T34/T45 | 0.43 | TL/ImgH | 1.69 |
| T45/T56 | 1.39 | TL/EPD | 3.36 |
| T67/T56 | 0.22 | f/ImgH | 0.94 |
| (T34 + T56 + T67)/T45 | 1.31 | SD/TD | 0.76 |
| f/R8 | 1.02 | BL/EPD | 0.69 |
| f/R10 | 1.15 | Yc52/CT5 | 4.27 |
| R8/R13 | 1.17 | (TL*f)/(ImgH*EPD) | 3.18 |

7th Embodiment

Figure 7A:
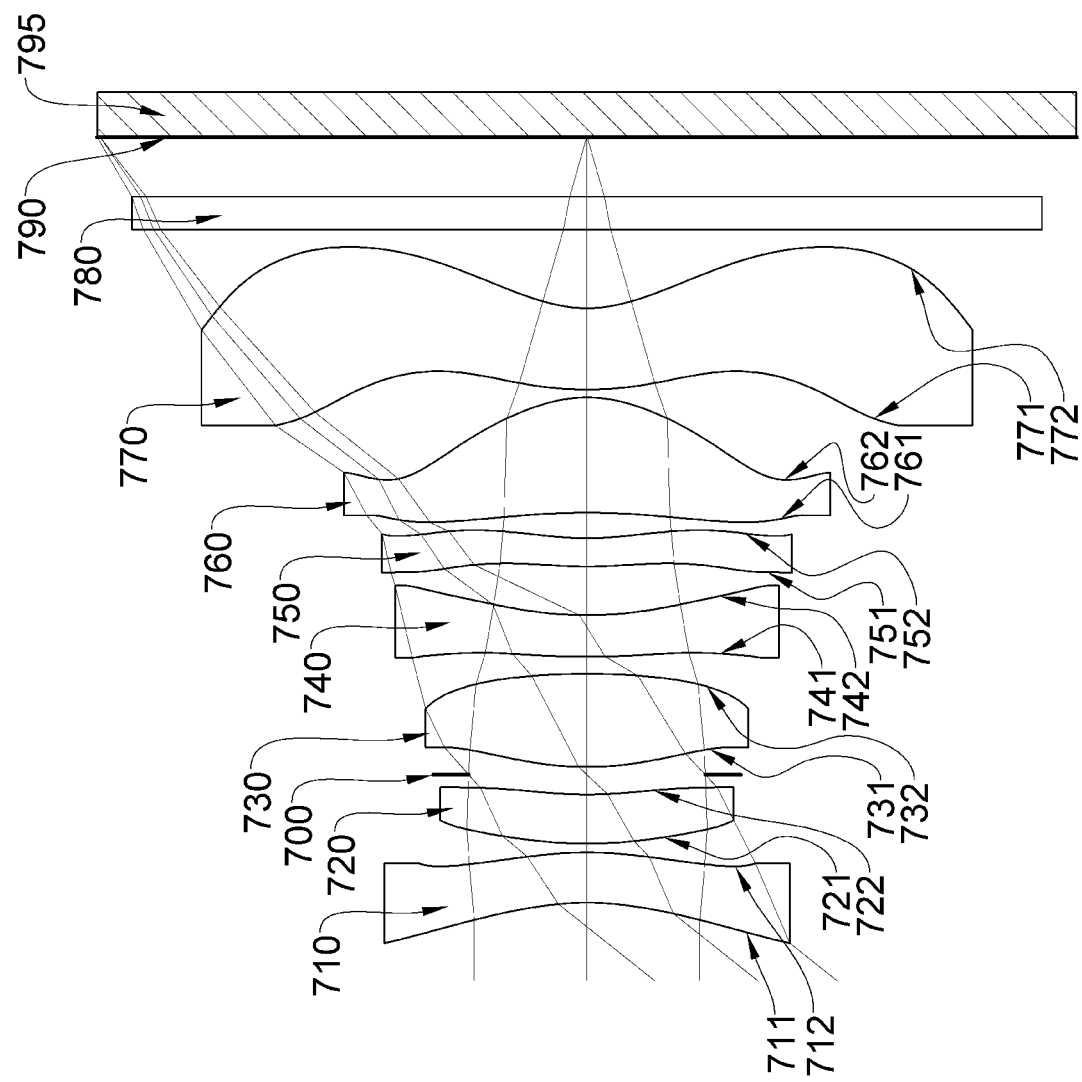
FIG. 7A is a schematic view of an imaging apparatus according to the 7th embodiment of the present disclosure.
Figure 7B:
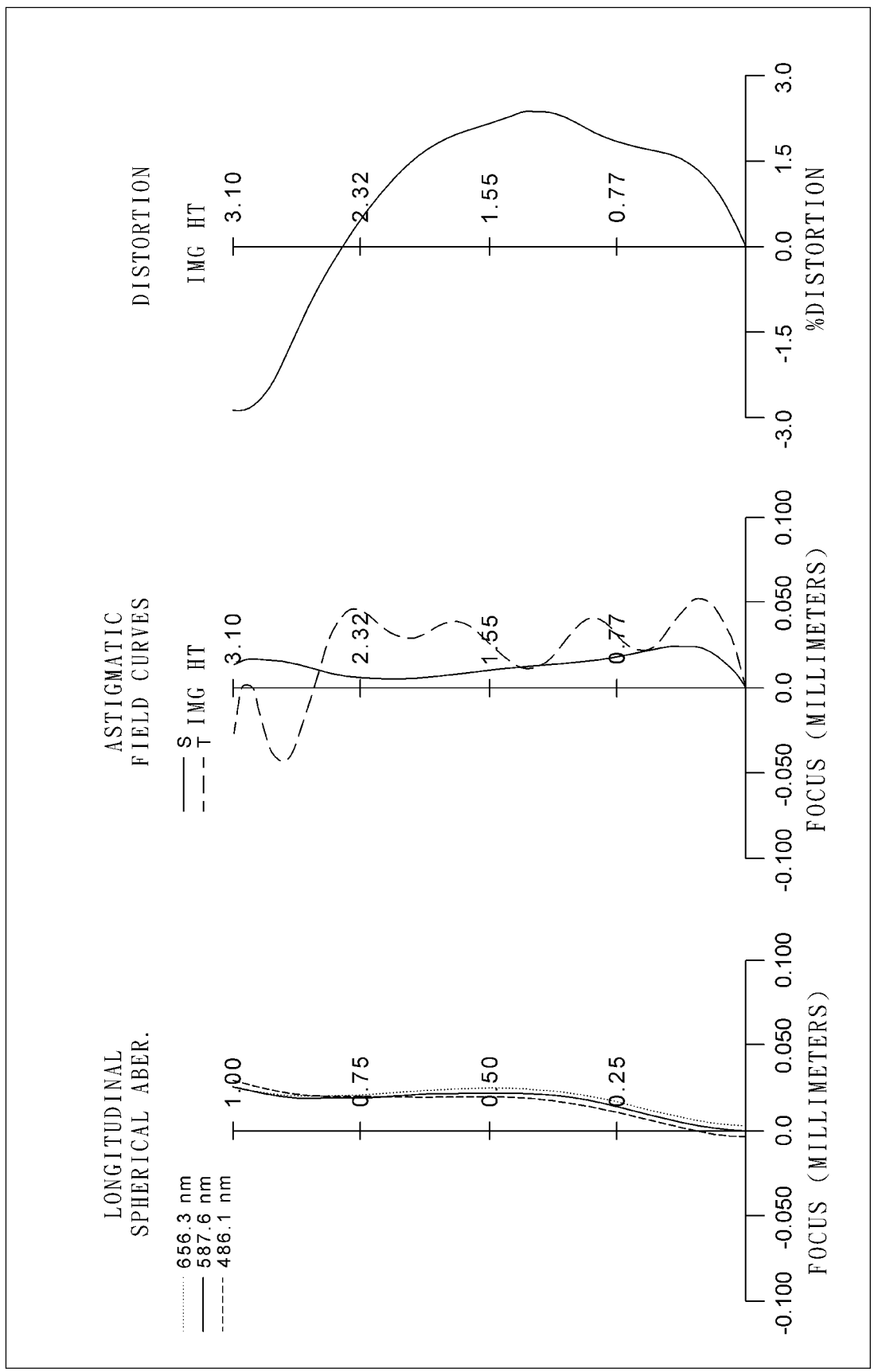
FIG. 7B shows longitudinal spherical aberration curves, astigmatic field curves and a distortion curve of the imaging apparatus according to the 7th embodiment.

FIG. 7A is a schematic view of an imaging apparatus according to the 7th embodiment of the present disclosure. FIG. 7B shows, in order from left to right, longitudinal spherical aberration curves, astigmatic field curves and a distortion curve of the imaging apparatus according to the 7th embodiment.

In FIG. 7A, the imaging apparatus includes a photographing lens system (not otherwise herein labeled) of the present disclosure and an image sensor 795. The photographing lens system includes, in order from an object side to an image side, a first lens element 710, a second lens element 720, an aperture stop 700, a third lens element 730, a fourth lens element 740, a fifth lens element 750, a sixth lens element 760, a seventh lens element 770, and an image surface 790. The image sensor 795 is disposed on or near the image surface 790, and the photographing lens system includes seven lens elements (710, 720, 730, 740, 750, 760 and 770) without any other lens element being inserted between them.

The first lens element 710 has negative refractive power and is made of plastic material. The first lens element 710 has an object-side surface 711 being concave in a paraxial region with at least one inflection point in an off-axis region thereof, and an image-side surface 712 being convex in a paraxial region with at least one inflection point in an off-axis region thereof. Both the object-side surface 711 and the image-side surface 712 are aspheric.

The second lens element 720 has negative refractive power and is made of plastic material. The second lens element 720 has an object-side surface 721 being convex in a paraxial region thereof, and an image-side surface 722 being concave in a paraxial region thereof. Both the object-side surface 721 and the image-side surface 722 are aspheric.

The third lens element 730 has positive refractive power and is made of plastic material. The third lens element 730 has an object-side surface 731 being convex in a paraxial region thereof, and an image-side surface 732 being convex in a paraxial region thereof. Both the object-side surface 731 and the image-side surface 732 are aspheric.

The fourth lens element 740 has negative refractive power and is made of plastic material. The fourth lens element 740 has an object-side surface 741 being convex in a paraxial region thereof, and an image-side surface 742 being concave in a paraxial region thereof. Both the object-side surface 741 and the image-side surface 742 are aspheric.

The fifth lens element 750 has negative refractive power and is made of plastic material. The fifth lens element 750 has an object-side surface 751 being convex in a paraxial region thereof, and an image-side surface 752 being concave in a paraxial region with at least one critical point in an off-axis region thereof. Both the object-side surface 751 and the image-side surface 752 are aspheric.

The sixth lens element 760 has positive refractive power and is made of plastic material. The sixth lens element 760 has an object-side surface 761 being concave in a paraxial region with at least one inflection point in an off-axis region thereof, and an image-side surface 762 being convex in a paraxial region with at least one inflection point in an off-axis region thereof. Both the object-side surface 761 and the image-side surface 762 are aspheric.

The seventh lens element 770 has negative refractive power and is made of plastic material. The seventh lens element 770 has an object-side surface 771 being convex in a paraxial region, and an image-side surface 772 being concave in a paraxial region with at least one inflection point in an off-axis region thereof. Both the object-side surface 771 and the image-side surface 772 are aspheric.

The photographing lens system further includes a filter 780 disposed between the seventh lens element 770 and the image surface 790. The filter 780 is made of glass material and does not affect a focal length of the photographing lens system.

The detailed optical data of the 7th embodiment are shown in TABLE 13, and the aspheric surface data are shown in TABLE 14.

TABLE 13

(7th Embodiment)
f = 2.53 mm, Fno = 1.76, HFOV = 51.5 deg.

| Surface# | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −1.828 | ASP | 0.320 | Plastic | 1.544 | 55.9 | −22.24 |
| 2 | | −2.287 | ASP | 0.056 | | | | |
| 3 | Lens 2 | 2.606 | ASP | 0.313 | Plastic | 1.544 | 55.9 | −101.16 |
| 4 | | 2.382484 | ASP | 0.126 | | | | |
| 5 | Ape. Stop | Plano | | 0.050 | | | | |
| 6 | Lens 3 | 1.865 | ASP | 0.594 | Plastic | 1.544 | 55.9 | 2.47 |
| 7 | | −4.278 | ASP | 0.109 | | | | |
| 8 | Lens 4 | 5.576 | ASP | 0.265 | Plastic | 1.671 | 19.5 | −6.64 |
| 9 | | 2.430 | ASP | 0.310 | | | | |
| 10 | Lens 5 | 2.519 | ASP | 0.180 | Plastic | 1.660 | 20.3 | −7.71 |
| 11 | | 1.637 | ASP | 0.163 | | | | |
| 12 | Lens 6 | −4.817 | ASP | 0.735 | Plastic | 1.544 | 55.9 | 1.76 |
| 13 | | −0.841 | ASP | 0.050 | | | | |
| 14 | Lens 7 | 2.109 | ASP | 0.520 | Plastic | 1.544 | 55.9 | −2.93 |
| 15 | | 0.829 | ASP | 0.500 | | | | |
| 16 | Filter | Plano | | 0.210 | Glass | 1.517 | 64.2 | — |
| 17 | | Plano | | 0.380 | | | | |
| 18 | Image Surface | Plano | | — | | | | |

\* Reference Wavelength d-line 587.6 nm

TABLE 14

Aspheric Coefficients

| Surface # | 1 | 2 | 3 | 4 | 6 | 7 | 8 |
|---|---|---|---|---|---|---|---|
| k= | −1.7760E+01 | −2.4218E+01 | −1.1063E+00 | −1.3401E+01 | −7.4247E+00 | −4.7653E+00 | −1.0000E+00 |
| A4= | −1.2084E−01 | 2.9437E−02 | −1.0542E−01 | −2.9504E−01 | −2.3384E−02 | 8.5924E−02 | 6.0906E−02 |
| A6= | 2.7848E−01 | 4.0626E−02 | 1.3159E−01 | 4.2570E−01 | −2.0650E−02 | −4.4478E−01 | −4.9693E−01 |
| A8= | −3.9766E−01 | −1.1250E−01 | −2.0786E−01 | −5.6507E−01 | −5.5001E−02 | 5.6255E−01 | 4.3747E−01 |
| A10= | 3.4076E−01 | 1.1291E−01 | 2.2394E−01 | 4.8435E−01 | 6.4762E−02 | −3.2185E−01 | 1.3137E−01 |
| A12= | −1.6404E−01 | −2.4099E−02 | −3.7716E−02 | −1.2602E−01 | −5.7973E−02 | 3.4091E−02 | −3.2000E−01 |
| A14= | 4.0672E−02 | | | | | | 1.0610E−01 |
| A16= | −3.9831E−03 | | | | | | |

| Surface # | 9 | 10 | 11 | 12 | 13 | 14 | 15 |
|---|---|---|---|---|---|---|---|
| k= | 1.9191E+00 | −8.9998E+01 | −3.2699E+01 | 7.5403E+00 | −5.6043E+00 | −1.1205E−01 | −4.1114E+00 |
| A4= | 1.9585E−03 | −2.5253E−01 | −2.1390E−01 | −4.0280E−02 | −3.6273E−01 | −1.6293E−02 | −3.5851E−02 |
| A6= | −2.4576E−01 | 3.4039E−01 | 3.2372E−01 | 4.6475E−01 | 7.0668E−01 | −2.8866E−01 | −3.9983E−02 |
| A8= | 2.3285E−01 | −5.0360E−01 | −4.3500E−01 | −1.0211E+00 | −1.0538E+00 | 2.6766E−01 | 3.4473E−02 |
| A10= | −6.6955E−02 | 4.8923E−01 | 2.5812E−01 | 1.1673E+00 | 9.5326E−01 | −1.2523E−01 | −1.2963E−02 |
| A12= | −5.6934E−03 | −2.1305E−01 | 1.4317E−02 | −7.1032E−01 | −4.4800E−01 | 3.2610E−02 | 2.6180E−03 |
| A14= | | 3.1480E−02 | −6.6898E−02 | 2.2204E−01 | 1.0309E−01 | −4.4322E−03 | −2.7755E−04 |
| A16= | | | 1.7712E−02 | −2.8435E−02 | −9.2712E−03 | 2.4350E−04 | 1.2097E−05 |

In the 7th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 7th embodiment, so an explanation in this regard will not be provided again.

Moreover, these parameters can be calculated from TABLE 13 and TABLE 14 and satisfy the conditions stated in table below.

| 7th Embodiment | | | |
|---|---|---|---|
| f [mm] | 2.53 | (R5 + R6)/(R5 − R6) | −0.39 |
| Fno. | 1.76 | f/f5 | −0.33 |
| HFOV [deg.] | 51.5 | f2/TL | −20.72 |
| V5 | 20.3 | (f/f1) + (f/f2) | −0.14 |
| Vmin | 19.5 | (f/f3) + (f/f6) | 2.46 |
| V4/V2 | 0.35 | |f/fi|min | 0.02 |
| (Vi/Ni)min | 11.67 | f/EPD | 1.76 |
| ΣAT/ΣCT | 0.30 | TL/f | 1.93 |
| T34/T45 | 0.35 | TL/ImgH | 1.57 |
| T45/T56 | 1.90 | TL/EPD | 3.40 |
| T67/T56 | 0.31 | f/ImgH | 0.82 |
| (T34 + T56 + T67)/T45 | 1.04 | SD/TD | 0.79 |
| f/R8 | 1.04 | BL/EPD | 0.76 |
| f/R10 | 1.54 | Yc52/CT5 | 4.00 |
| R8/R13 | 1.15 | (TL*f)/(ImgH*EPD) | 2.77 |

8th Embodiment

Figure 8A:
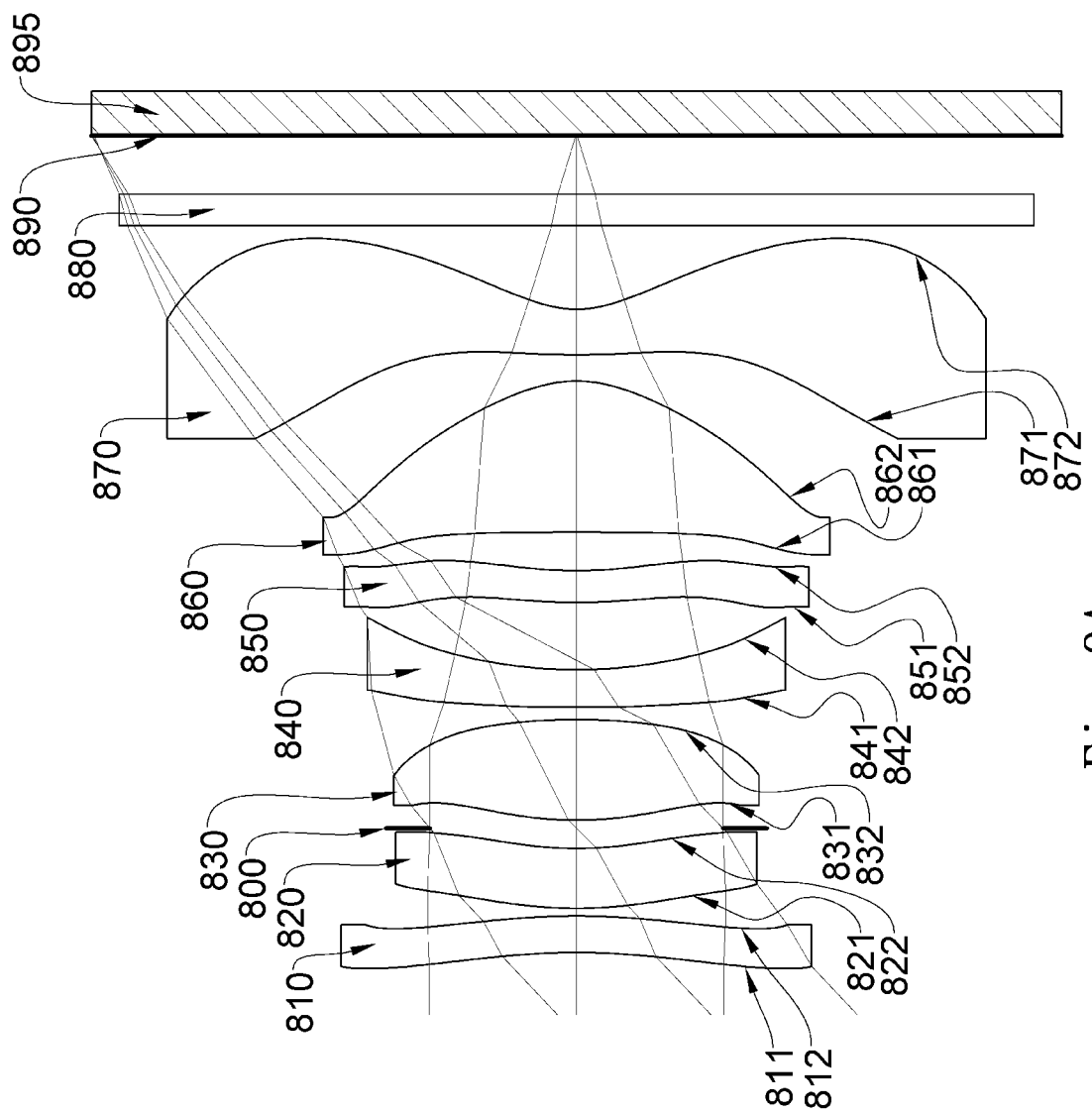
FIG. 8A is a schematic view of an imaging apparatus according to the 8th embodiment of the present disclosure.
Figure 8B:
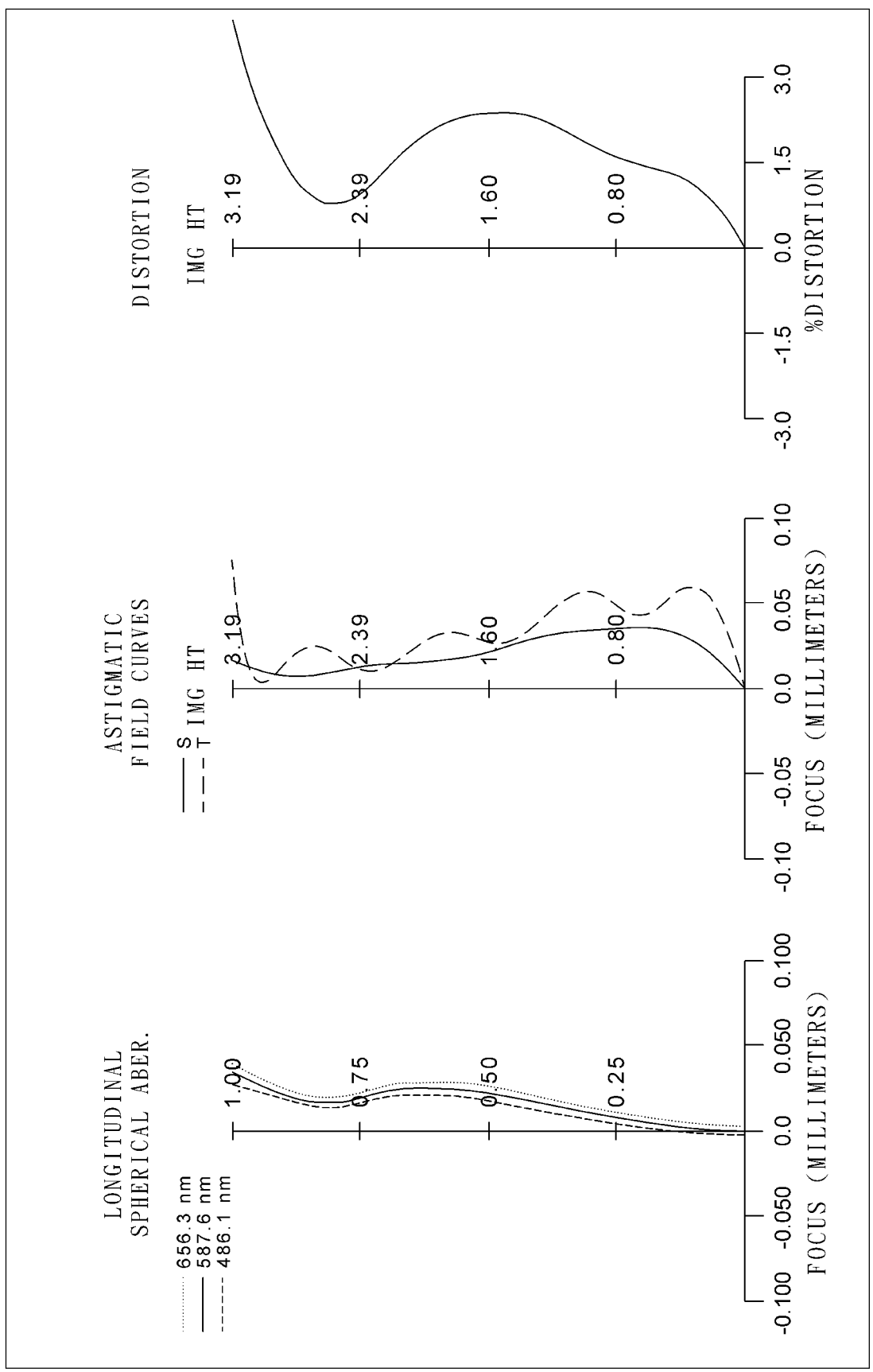
FIG. 8B shows longitudinal spherical aberration curves, astigmatic field curves and a distortion curve of the imaging apparatus according to the 8th embodiment.

FIG. 8A is a schematic view of an imaging apparatus according to the 8th embodiment of the present disclosure. FIG. 8B shows, in order from left to right, longitudinal spherical aberration curves, astigmatic field curves and a distortion curve of the imaging apparatus according to the 8th embodiment.

In FIG. 8A, the imaging apparatus includes a photographing lens system (not otherwise herein labeled) of the present disclosure and an image sensor 895. The photographing lens system includes, in order from an object side to an image side, a first lens element 810, a second lens element 820, an aperture stop 800, a third lens element 830, a fourth lens element 840, a fifth lens element 850, a sixth lens element 860, a seventh lens element 870, and an image surface 890. The image sensor 895 is disposed on or near the image surface 890, and the photographing lens system includes seven lens elements (810, 820, 830, 840, 850, 860 and 870) without any other lens element being inserted between them.

The first lens element 810 has negative refractive power and is made of plastic material. The first lens element 810 has an object-side surface 811 being concave in a paraxial region with at least one inflection point in an off-axis region thereof, and an image-side surface 812 being convex in a paraxial region with at least one inflection point in an off-axis region thereof. Both the object-side surface 811 and the image-side surface 812 are aspheric.

The second lens element 820 has negative refractive power and is made of plastic material. The second lens element 820 has an object-side surface 821 being convex in a paraxial region thereof, and an image-side surface 822 being concave in a paraxial region thereof. Both the object-side surface 821 and the image-side surface 822 are aspheric.

The third lens element 830 has positive refractive power and is made of plastic material. The third lens element 830 has an object-side surface 831 being convex in a paraxial region thereof, and an image-side surface 832 being convex in a paraxial region thereof. Both the object-side surface 831 and the image-side surface 832 are aspheric.

The fourth lens element 840 has negative refractive power and is made of plastic material. The fourth lens element 840 has an object-side surface 841 being convex in a paraxial region thereof, and an image-side surface 842 being concave in a paraxial region thereof. Both the object-side surface 841 and the image-side surface 842 are aspheric.

The fifth lens element 850 has negative refractive power and is made of plastic material. The fifth lens element 850 has an object-side surface 851 being convex in a paraxial region thereof, and an image-side surface 852 being concave in a paraxial region with at least one critical point in an off-axis region thereof. Both the object-side surface 851 and the image-side surface 852 are aspheric.

The sixth lens element 860 has positive refractive power and is made of plastic material. The sixth lens element 860 has an object-side surface 861 being concave in a paraxial region with at least one inflection point in an off-axis region thereof, and an image-side surface 862 being convex in a paraxial region with at least one inflection point in an off-axis region thereof. Both the object-side surface 861 and the image-side surface 862 are aspheric.

The seventh lens element 870 has negative refractive power and is made of plastic material. The seventh lens element 870 has an object-side surface 871 being convex in a paraxial region, and an image-side surface 872 being concave in a paraxial region with at least one inflection point in an off-axis region thereof. Both the object-side surface 871 and the image-side surface 872 are aspheric.

The photographing lens system further includes a filter 880 disposed between the seventh lens element 870 and the image surface 890. The filter 880 is made of glass material and does not affect a focal length of the photographing lens system.

The detailed optical data of the 8th embodiment are shown in TABLE 15, and the aspheric surface data are shown in TABLE 16.

| (8th Embodiment) f = 3.22 mm, Fno = 1.66, HFOV = 43.4 deg. | | | | | | | |
|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | −4.156 | ASP | 0.240 | Plastic | 1.583 | 30.2 | −107.40 |
| 2 | | −4.546 | ASP | 0.050 | | | | |
| 3 | Lens 2 | 2.674 | ASP | 0.396 | Plastic | 1.544 | 55.9 | −46.03 |
| 4 | | 2.290 | ASP | 0.134 | | | | |
| 5 | Ape. Stop | Plano | | 0.053 | | | | |
| 6 | Lens 3 | 2.318 | ASP | 0.664 | Plastic | 1.544 | 55.9 | 2.74 |
| 7 | | −3.750 | ASP | 0.080 | | | | |
| 8 | Lens 4 | 15.564 | ASP | 0.250 | Plastic | 1.671 | 19.5 | −6.28 |

-continued (8th Embodiment)
f = 3.22 mm, Fno = 1.66, HFOV = 43.4 deg.

| Surface # | | Curvature Radius | | Thickness | Material | Index | Abbe # | Focal Length |
|---|---|---|---|---|---|---|---|---|
| 9 | | 3.292 | ASP | 0.443 | | | | |
| 10 | Lens 5 | 3.270 | ASP | 0.210 | Plastic | 1.660 | 20.3 | −19.88 |
| 11 | | 2.551 | ASP | 0.254 | | | | |
| 12 | Lens 6 | −68.496 | ASP | 0.998 | Plastic | 1.544 | 55.9 | 1.47 |
| 13 | | −0.793 | ASP | 0.173 | | | | |
| 14 | Lens 7 | 4.968 | ASP | 0.300 | Plastic | 1.534 | 55.9 | −1.46 |
| 15 | | 0.659 | ASP | 0.550 | | | | |
| 16 | Filter | Plano | | 0.210 | Glass | 1.517 | 64.2 | — |
| 17 | | Plano | | 0.386 | | | | |
| 18 | Image Surface | Plano | | — | | | | |

* Reference Wavelength d-line 587.6 nm

TABLE 16

Aspheric Coefficients

| Surface # | 1 | 2 | 3 | 4 | 6 | 7 | 8 |
|---|---|---|---|---|---|---|---|
| k= | −4.4464E+01 | −3.4079E+01 | −5.6799E+00 | −3.1829E+00 | −6.3728E+00 | −5.0000E+01 | −1.2673E+01 |
| A4= | −6.6675E−03 | 7.1805E−03 | −5.6730E−02 | −1.0803E−01 | 1.0072E−02 | −9.1835E−03 | 1.3990E−01 |
| A6= | 1.3846E−02 | 3.9042E−04 | 2.2006E−02 | 4.1844E−03 | −8.7979E−02 | −2.1616E−01 | −3.9324E−01 |
| A8= | −7.8574E−03 | 2.4670E−03 | −2.4505E−02 | −1.4630E−02 | −1.2265E−03 | 1.8827E−01 | 4.5315E−01 |
| A10= | 3.1524E−03 | 2.6489E−04 | 1.5562E−02 | 2.9005E−02 | 1.0936E−02 | −6.3969E−02 | −2.2337E−01 |
| A12= | −4.1197E−04 | −6.2105E−04 | −3.9876E−05 | 9.1041E−07 | 1.4948E−04 | 1.5459E−06 | 3.9928E−02 |
| A14= | | 4.2986E−04 | | | | | −1.3746E−05 |

| Surface # | 9 | 10 | 11 | 12 | 13 | 14 | 15 |
|---|---|---|---|---|---|---|---|
| k= | 3.9912E+00 | −3.8583E+01 | −2.1011E+01 | 1.4223E+01 | −5.4777E+00 | −1.0264E+01 | −4.3677E+00 |
| A4= | 2.2264E−02 | −7.2648E−02 | −6.0025E−02 | −3.6452E−02 | −2.1838E−01 | −1.3745E−01 | −6.8659E−02 |
| A6= | −1.1635E−01 | −1.4065E−02 | 5.3240E−03 | 3.6368E−02 | 3.1108E−01 | 3.4140E−02 | 2.1865E−02 |
| A8= | 1.2931E−01 | −4.0272E−02 | −2.9100E−02 | −1.1184E−02 | −3.5323E−01 | −6.4597E−03 | −4.6720E−03 |
| A10= | −5.5360E−02 | 4.8420E−02 | 2.7455E−03 | −4.8605E−02 | 2.5986E−01 | 2.0447E−03 | 5.1961E−04 |
| A12= | 6.8750E−03 | −7.3146E−03 | 2.1694E−02 | 4.5093E−02 | −1.1774E−01 | −4.7878E−04 | −3.1214E−05 |
| A14= | −2.4738E−05 | −1.7275E−03 | −1.0356E−02 | −1.3903E−02 | 2.9374E−02 | 5.4073E−05 | 1.5541E−06 |
| A16= | | | 1.2731E−03 | 1.4330E−03 | −2.9883E−03 | −2.3521E−06 | −8.6922E−08 |

In the 8th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 8th embodiment, so an explanation in this regard will not be provided again.

Moreover, these parameters can be calculated from TABLE 15 and TABLE 16 and satisfy the conditions stated in table below.

| 8th Embodiment | | | |
|---|---|---|---|
| f [mm] | 3.22 | (R5 + R6)/(R5 − R6) | −0.24 |
| Fno. | 1.66 | f/f5 | −0.16 |
| HFOV [deg.] | 43.4 | f2/TL | −8.54 |
| V5 | 20.3 | (f/f1) + (f/f2) | −0.10 |
| Vmin | 19.5 | (f/f3) + (f/f6) | 3.37 |
| V4/V2 | 0.35 | |f/fi|min | 0.03 |
| (Vi/Ni)min | 11.67 | f/EPD | 1.66 |
| ΣAT/ΣCT | 0.39 | TL/f | 1.67 |
| T34/T45 | 0.18 | TL/ImgH | 1.69 |
| T45/T56 | 1.74 | TL/EPD | 2.78 |
| T67/T56 | 0.68 | f/ImgH | 1.01 |
| (T34 + T56 + T67)/T45 | 1.14 | SD/TD | 0.81 |
| f/R8 | 0.98 | BL/EPD | 0.59 |

-continued

| 8th Embodiment | | | |
|---|---|---|---|
| f/R10 | 1.26 | Yc52/CT5 | 4.14 |
| R8/R13 | 0.66 | (TL*f)/(ImgH*EPD) | 2.80 |

9th Embodiment

Figure 9B:
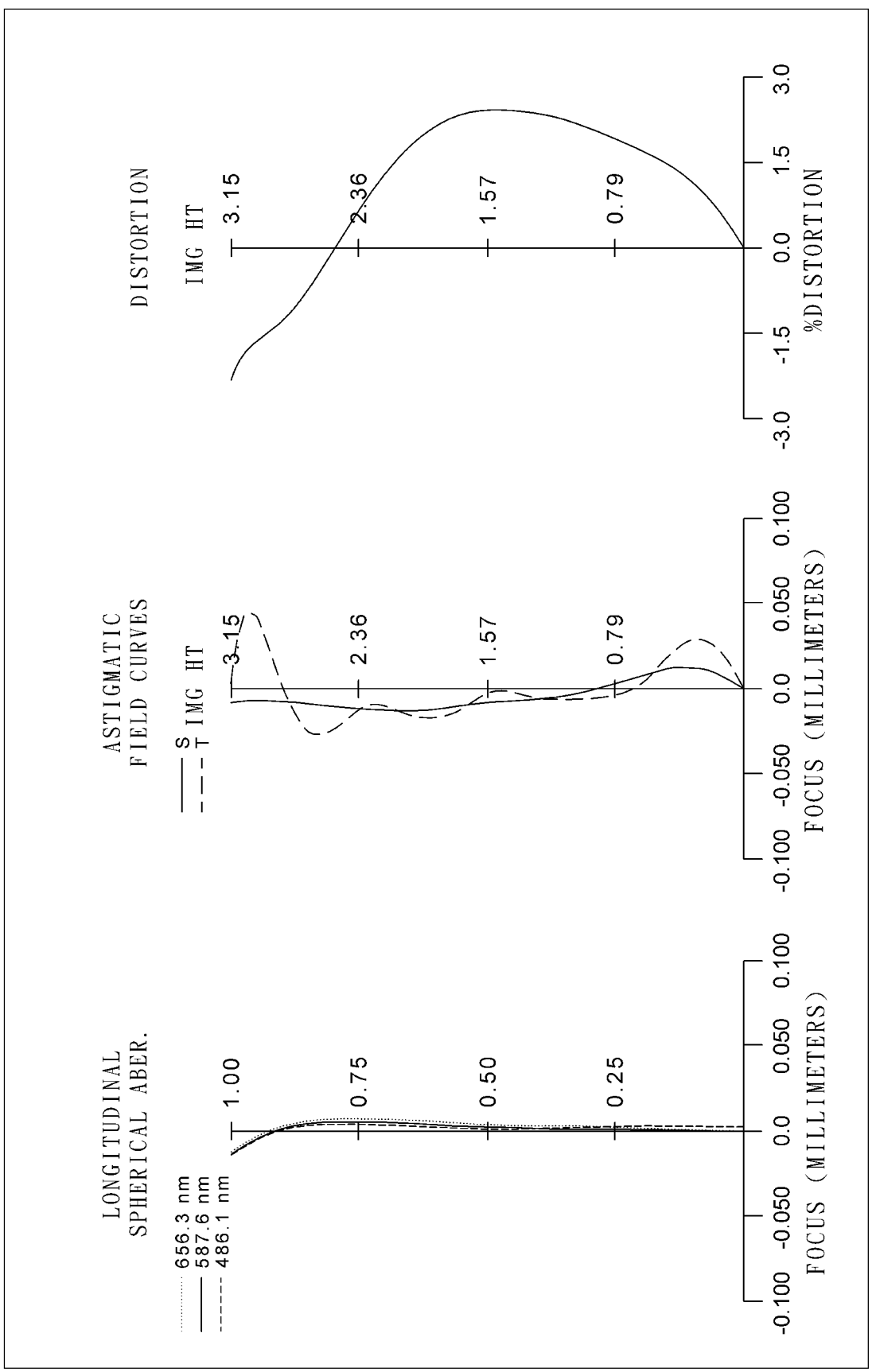
FIG. 9B shows longitudinal spherical aberration curves, astigmatic field curves and a distortion curve of the imaging apparatus according to the 9th embodiment.

FIG. 9A is a schematic view of an imaging apparatus according to the 9th embodiment of the present disclosure. FIG. 9B shows, in order from left to right, longitudinal spherical aberration curves, astigmatic field curves and a distortion curve of the imaging apparatus according to the 9th embodiment.

In FIG. 9A, the imaging apparatus includes a photographing lens system (not otherwise herein labeled) of the present disclosure and an image sensor 995. The photographing lens system includes, in order from an object side to an image side, a first lens element 910, a second lens element 920, an aperture stop 900, a third lens element 930, a fourth lens element 940, a fifth lens element 950, a sixth lens element 960, a seventh lens element 970, and an image surface 990. The image sensor 995 is disposed on or near the image surface 990, and the photographing lens system includes seven lens elements (910, 920, 930, 940, 950, 960 and 970) without any other lens element being inserted between them.

The first lens element 910 has negative refractive power and is made of plastic material. The first lens element 910 has an object-side surface 911 being convex in a paraxial region with at least one inflection point in an off-axis region thereof, and an image-side surface 912 being concave in a paraxial region thereof. Both the object-side surface 911 and the image-side surface 912 are aspheric.

The second lens element 920 has negative refractive power and is made of plastic material. The second lens element 920 has an object-side surface 921 being concave in a paraxial region thereof, and an image-side surface 922 being convex in a paraxial region thereof. Both the object-side surface 921 and the image-side surface 922 are aspheric.

The third lens element 930 has positive refractive power and is made of plastic material. The third lens element 930 has an object-side surface 931 being convex in a paraxial region thereof, and an image-side surface 932 being convex in a paraxial region thereof. Both the object-side surface 931 and the image-side surface 932 are aspheric.

The fourth lens element 940 has negative refractive power and is made of plastic material. The fourth lens element 940 has an object-side surface 941 being convex in a paraxial region thereof, and an image-side surface 942 being concave in a paraxial region thereof. Both the object-side surface 941 and the image-side surface 942 are aspheric.

The fifth lens element 950 has positive refractive power and is made of plastic material. The fifth lens element 950 has an object-side surface 951 being concave in a paraxial region thereof, and an image-side surface 952 being convex in a paraxial region with at least one critical point in an off-axis region thereof. Both the object-side surface 951 and the image-side surface 952 are aspheric.

The sixth lens element 960 has positive refractive power and is made of plastic material. The sixth lens element 960 has an object-side surface 961 being concave in a paraxial region with at least one inflection point in an off-axis region thereof, and an image-side surface 962 being convex in a paraxial region with at least one inflection point in an off-axis region thereof. Both the object-side surface 961 and the image-side surface 962 are aspheric.

The seventh lens element 970 has negative refractive power and is made of plastic material. The seventh lens element 970 has an object-side surface 971 being convex in a paraxial region, and an image-side surface 972 being concave in a paraxial region with at least one inflection point in an off-axis region thereof. Both the object-side surface 971 and the image-side surface 972 are aspheric.

The photographing lens system further includes a filter 980 disposed between the seventh lens element 970 and the image surface 990. The filter 980 is made of glass material and does not affect a focal length of the photographing lens system.

The detailed optical data of the 9th embodiment are shown in TABLE 17, and the aspheric surface data are shown in TABLE 18.

TABLE 17

(9th Embodiment)
f = 2.63 mm, Fno = 1.80, HFOV = 50.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 48.860 | ASP | 0.200 | Plastic | 1.530 | 55.8 | −9.74 |
| 2 | | 4.664 | ASP | 0.620 | | | | |
| 3 | Lens 2 | −8.646 | ASP | 0.459 | Plastic | 1.544 | 55.9 | −18.02 |
| 4 | | −74.349 | ASP | 0.050 | | | | |
| 5 | Ape. Stop | Plano | | 0.050 | | | | |
| 6 | Lens 3 | 1.416 | ASP | 0.779 | Plastic | 1.544 | 55.9 | 1.92 |
| 7 | | −3.226 | ASP | 0.131 | | | | |
| 8 | Lens 4 | 5.012 | ASP | 0.265 | Plastic | 1.725 | 17.5 | −4.58 |
| 9 | | 1.952 | ASP | 0.465 | | | | |
| 10 | Lens 5 | −46.485 | ASP | 0.264 | Plastic | 1.583 | 30.2 | 45.12 |
| 11 | | −16.840 | ASP | 0.252 | | | | |
| 12 | Lens 6 | −1.937 | ASP | 0.497 | Plastic | 1.544 | 55.9 | 2.02 |
| 13 | | −0.764 | ASP | 0.123 | | | | |
| 14 | Lens 7 | 2.143 | ASP | 0.355 | Plastic | 1.583 | 30.2 | −2.32 |
| 15 | | 0.780 | ASP | 0.500 | | | | |
| 16 | Filter | Plano | | 0.210 | | 1.517 | 64.2 | — |
| 17 | | Plano | | 0.335 | | | | |
| 18 | Image Surface | Plano | | — | | | | |

* Reference Wavelength d-line 587.6 nm

TABLE 18

| Aspheric Coefficients | | | | | | | |
|---|---|---|---|---|---|---|---|
| Surface# | 1 | 2 | 3 | 4 | 6 | 7 | 8 |
| k= | −1.7758E+01 | −2.4207E+01 | −1.1069E+00 | −1.3405E+01 | −6.6366E+00 | −4.7325E+00 | −8.7601E−01 |
| A4= | 1.1522E−01 | 2.0350E−01 | 5.3467E−02 | −2.4106E−01 | 2.8931E−02 | 1.4941E−01 | 6.7944E−02 |
| A6= | −1.1560E−01 | −1.2849E−01 | −7.7906E−02 | 2.7321E−01 | 6.2533E−03 | −4.1117E−01 | −4.4399E−01 |
| A8= | 4.7449E−02 | 2.1058E−02 | 2.6558E−03 | −3.2947E−01 | −6.8383E−02 | 4.4494E−01 | 6.1037E−01 |
| A10= | −2.2182E−02 | −8.0574E−03 | 2.4964E−02 | 2.3958E−01 | 4.7587E−02 | −2.5367E−01 | −3.6138E−01 |
| A12= | 1.3397E−02 | 9.7100E−03 | −7.6090E−03 | −7.2608E−02 | −1.1056E−02 | 5.6853E−02 | 9.2486E−02 |
| A14= | −4.4040E−03 | | | | | | −8.0739E−03 |
| A16= | 5.1952E−04 | | | | | | |

TABLE 18-continued

| Aspheric Coefficients | | | | | | | |
|---|---|---|---|---|---|---|---|
| Surface # | 9 | 10 | 11 | 12 | 13 | 14 | 15 |
| k= | 8.1482E−01 | −8.9998E+01 | −3.2746E+01 | 6.2296E−01 | −4.3832E+00 | −2.2310E−01 | −3.8002E+00 |
| A4= | −5.4999E−02 | 3.6826E−02 | 2.7201E−02 | −7.0532E−02 | −3.4828E−01 | 1.5850E−03 | −4.1795E−02 |
| A6= | −1.6239E−01 | −2.7382E−01 | −1.4593E−01 | 7.9701E−01 | 8.7123E−01 | −2.3064E−01 | −3.5354E−02 |
| A8= | 2.2673E−01 | 3.2229E−01 | 1.1155E−01 | −1.4808E+00 | −1.2077E+00 | 2.0630E−01 | 3.6202E−02 |
| A10= | −1.0375E−01 | −1.4675E−01 | −1.9327E−01 | 1.3120E+00 | 1.0217E+00 | −9.9584E−02 | −1.5953E−02 |
| A12= | 8.1545E−03 | −3.2405E−02 | 2.7906E−01 | −5.2202E−01 | −5.0426E−01 | 2.8937E−02 | 4.0127E−03 |
| A14= | 5.4801E−04 | 5.8454E−02 | −1.6913E−01 | 3.2910E−02 | 1.4074E−01 | −5.0041E−03 | −5.9892E−04 |
| A16= | | −1.5429E−02 | 3.6815E−02 | 3.5887E−02 | −2.0391E−02 | 4.7428E−04 | 4.9535E−05 |
| A18= | | | | −7.6691E−03 | 1.1637E−03 | −1.9053E−05 | −1.7472E−06 |

In the 9th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 9th embodiment, so an explanation in this regard will not be provided again.

Moreover, these parameters can be calculated from TABLE 17 and TABLE 18 and satisfy the conditions stated in table below.

| 9th Embodiment | | | |
|---|---|---|---|
| f [mm] | 2.63 | (R5 + R6)/(R5 − R6) | −0.39 |
| Fno. | 1.80 | f/f5 | 0.06 |
| HFOV [deg.] | 50.8 | f2/TL | −3.24 |
| V5 | 30.2 | (f/f1) + (f/f2) | −0.42 |
| Vmin | 17.5 | (f/f3) + (f/f6) | 2.67 |
| V4/V2 | 0.31 | |f/fi|min | 0.06 |
| (Vi/Ni)min | 10.14 | f/EPD | 1.80 |
| ΣAT/ΣCT | 0.60 | TL/f | 2.11 |
| T34/T45 | 0.28 | TL/ImgH | 1.76 |
| T45/T56 | 1.85 | TL/EPD | 3.80 |
| T67/T56 | 0.49 | f/ImgH | 0.83 |
| (T34 + T56 + T67)/T45 | 1.09 | SD/TD | 0.71 |
| f/R8 | 1.35 | BL/EPD | 0.72 |
| f/R10 | −0.16 | Yc52/CT5 | 4.75 |
| R8/R13 | 0.91 | (TL*f)/(ImgH*EPD) | 3.17 |

10th Embodiment

Figure 11:
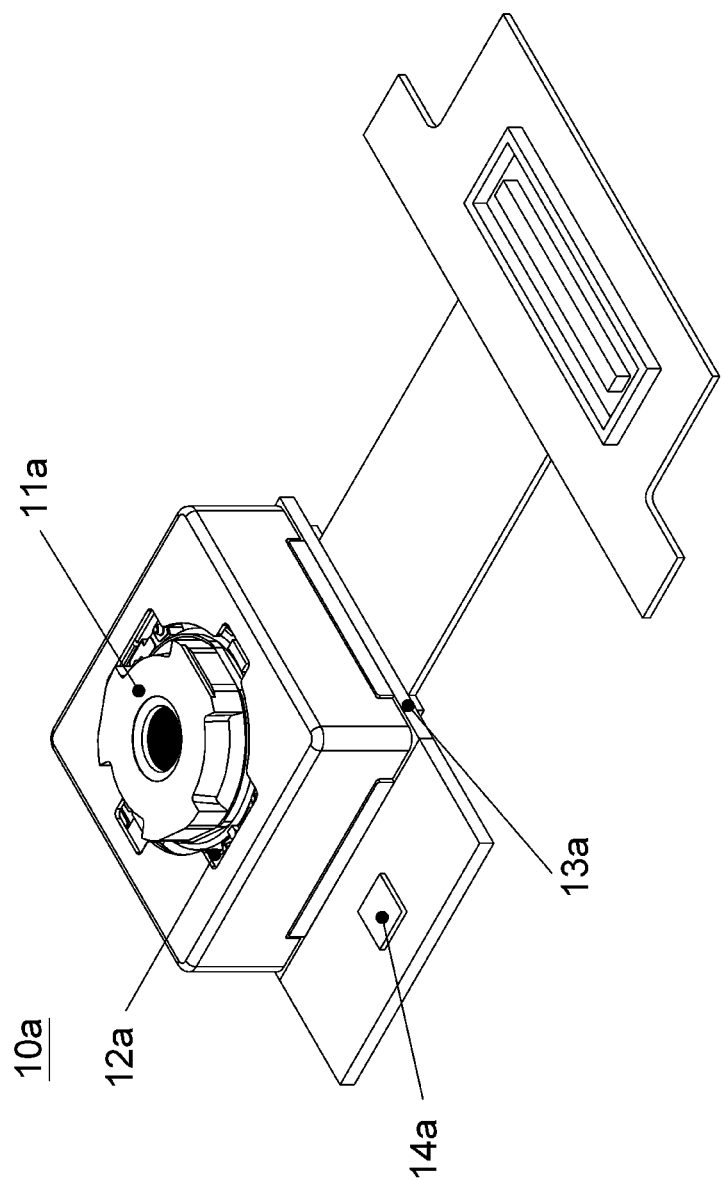
FIG. 11 shows a perspective view of an imaging apparatus according to the 10th embodiment of the present disclosure.

FIG. 11 is a 3-dimensional schematic view of an imaging apparatus 10a according to the 10th embodiment of the present disclosure. In the present embodiment, the imaging apparatus 10a is a camera module. The imaging apparatus 10a includes a lens unit 11a, a driving device 12a, and an image sensor 13a. The lens unit 11a includes the photographing lens system of the 1st embodiment described above and a lens barrel (not otherwise herein labeled) for carrying the photographing lens system. The imaging apparatus 10a uses the lens unit 11a to receive light and generates an image by, utilizes the driving device 12a to adjust the focus to photograph on the image sensor 13a, and outputs the image data thereafter.

The driving device 12a may be an auto-focus module that can be driven by a voice coil motor (VCM), a micro electro-mechanical system (MEMS), a piezoelectric system, shape memory alloys or other driving systems. The driving device 12a allows the lens unit 11a to obtain a better imaging position, so that a clear image can be obtained wherever an imaged object 30 (please refer to FIG. 13B) is positioned with different object distances.

The imaging apparatus 10a may be equipped with an image sensor 13a (e.g., CMOS, CCD) with high sensitivity and low noise on the image surface to provide accurate and satisfactory image quality from the photographing optical lens assembly.

In addition, the imaging apparatus 10a may further include an image stabilizer 14a, which may be a motion sensing element such as an accelerometer, a gyro sensor or a Hall Effect sensor. The image stabilizer 14a in the 10th embodiment is a gyro sensor but is not limited thereto. By adjusting the photographing lens system in different axial directions to provide compensation for image blurs due to motion during exposures, the image quality under dynamic and low-light circumstances can be further improved, and enhanced image compensation functions such as optical image stabilization (OIS) or electronic image stabilization (EIS) can also be provided.

11th Embodiment

Figure 12A:
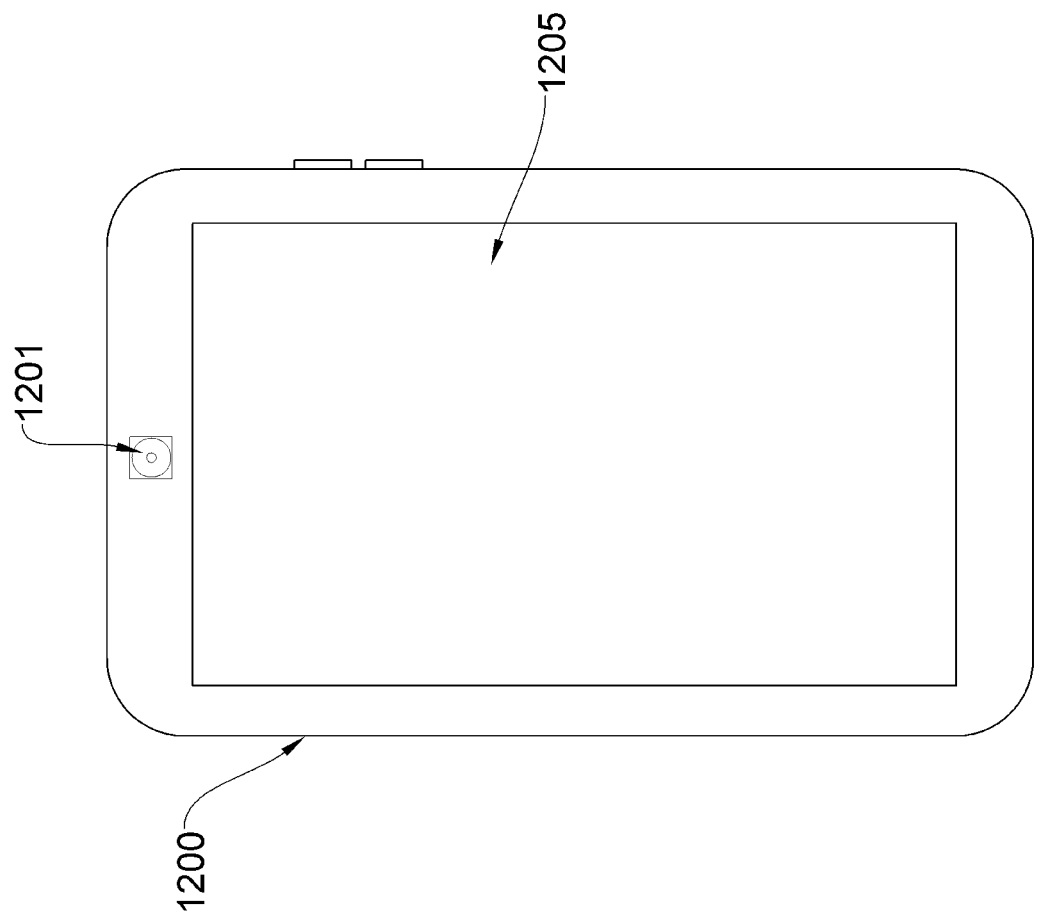
FIG. 12A shows a front view of the electronic device according to the 11th embodiment of the present disclosure.
Figure 12B:
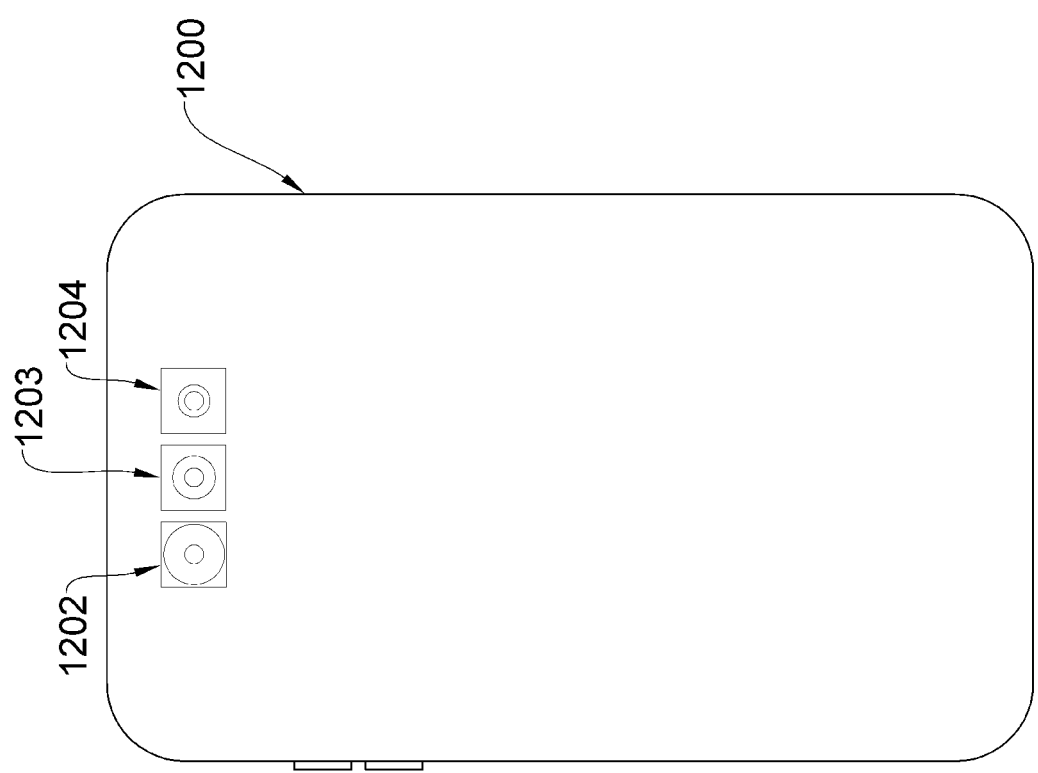
FIG. 12B shows a rear view of the electronic device according to the 11th embodiment of the present disclosure.

Please refer to FIG. 12A and FIG. 12B. FIG. 12A is a front view of an electronic device 1200. FIG. 12B is a rear view of the electronic device 1200 shown in the FIG. 12A. In the present embodiment, the electronic device 1200 is a smartphone. The electronic device 1200 includes an imaging apparatus 1201, an imaging apparatus 1202, an imaging apparatus 1203, an imaging apparatus 1204, and a display 1205. As shown in FIG. 12A, the imaging apparatus 1201 is positioned above the top of the display 1205. As shown in FIG. 12B, the imaging apparatus 1202, the imaging apparatus 1203, and the imaging apparatus 1204 face toward the same direction and are horizontally disposed on an upper edge of the back surface of the electronic device 1200. The imaging apparatus 1201 and the imaging apparatus 1202 utilize the photographing lens system according to the 1st embodiment but are not limited thereto. The imaging apparatus 1203 is a lens unit with a normal angle of view, the imaging apparatus 1204 is a telephoto lens unit, the fields of view of the imaging apparatus 1202 and the imaging apparatus 1203 differ by at least 20 degrees.

The aforementioned exemplary figures of different electronic devices are only exemplary for showing the imaging apparatus of the present disclosure installed in an electronic device, and the present disclosure is not limited thereto. Preferably, the electronic device can further include a control unit, a display unit, a storage unit, a random access memory unit (RAM) or a combination thereof.

The foregoing description, for purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing lens system, substantially consisting of seven lens elements, in order from an object side to an image side: a first lens element, a second lens element, a third lens element, a fourth lens element, a fifth lens element, a sixth lens element and a seventh lens element;

wherein each of the seven lens elements has an object-side surface facing toward the object side and an image-side surface facing toward the image side, the first lens element has negative refractive power, the second lens element has negative refractive power, the fourth lens element has an image-side surface being concave in a paraxial region thereof, the seventh lens element has an image-side surface being concave in a paraxial region thereof and at least one inflection point in an off-axis region thereof, an axial distance between the object-side surface of the first lens element and an image surface is TL, a focal length of the photographing lens system is f, a maximal image height of the photographing lens system is ImgH, a curvature radius of the image-side surface of the fourth lens element is R8, a sum of axial distances between each of adjacent lens elements of the photographing lens system is ΣAT, a sum of central thicknesses of the seven lens elements is ΣCT, and the following conditions are satisfied:

$0.80<TL/f<3.60;$ $1.0<TL/\mathrm{Img}H<2.10;$ $0.30<f/R8<8.0;$ and $0.10<\Sigma AT/\Sigma CT<0.83.$ 2. The photographing lens system of claim 1, wherein the seventh lens element has negative refractive power and the object-side surface of the seventh lens element is convex in a paraxial region thereof.

3. The photographing lens system of claim 1, wherein the third lens element has positive refractive power, the object-side surface of the third lens element is convex in a paraxial region thereof, and the fourth lens element has negative refractive power.

4. The photographing lens system of claim 1, wherein a minimum among Abbe numbers of the seven lens elements is V min, and the following condition is satisfied:

$10.0<V\min<22.0.$

5. The photographing lens system of claim 1, wherein an axial distance between the third lens element and the fourth lens element is T34, an axial distance between the fourth lens element and the fifth lens element is T45, an axial distance between the fifth lens element and the sixth lens element is T56, an axial distance between the sixth lens element and the seventh lens element is T67, the focal length of the photographing lens system is f, a focal length of the first lens element is f1, a focal length of the second lens element is f2, and the following conditions are satisfied:

$0.20<(T34+T56+T67)/T45<2.80;$ and $-1.50<(f/f1)+(f/f2)<-0.10.$

6. The photographing lens system of claim 1, wherein an axial distance between the fourth lens element and the fifth lens element is T45, an axial distance between the fifth lens element and the sixth lens element is T56, the axial distance between the object-side surface of the first lens element and the image surface is TL, an entrance pupil diameter of the photographing lens system is EPD, and the following conditions are satisfied:

$1.10<T45/T56<2.0;$ and $1.50<TL/\mathrm{EPD}<4.0.$

7. The photographing lens system of claim 1, wherein the focal length of the photographing lens system is f, an entrance pupil diameter of the photographing lens system is EPD, a focal length of the second lens element is f2, the axial distance between the object-side surface of the first lens element and the image surface is TL, and the following conditions are satisfied:

$1.0<f/\mathrm{EPD}<2.0;$ and $f2/TL<-0.70.$

8. The photographing lens system of claim 1, wherein the focal length of the photographing lens system is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a focal length of the i-th lens element is fi, wherein a minimum among |f/f1|, |f/f2|, |f/f3|, |f/f4|, |f/f5|, |f/f6| and |f/f7| is |f/fi|min, and the following condition is satisfied:

$|f/fi|\min<0.15.$

9. The photographing lens system of claim 1, further comprising an aperture stop, wherein a curvature radius of the object-side surface of the third lens element is R5, a curvature radius of the image-side surface of the third lens element is R6, an axial distance between the aperture stop and the image-side surface of the seventh lens element is SD, an axial distance between the object-side surface of the first lens element and the image-side surface of the seventh lens element is TD, half of a maximum field of view of the photographing lens system is HFOV, and the following conditions are satisfied:

$-1.0<(R5+R6)/(R5-R6)<0;$ $0.60<SD/TD<0.88;$ and $43.0\text{ degrees}<\mathrm{HFOV}<70.0\text{ degrees}.$ 10. The photographing lens system of claim 1, wherein an axial distance between the fifth lens element and the sixth lens element is T56, an axial distance between the sixth lens element and the seventh lens element is T67, and the following condition is satisfied:

$0<T67/T56<0.90.$

11. An imaging apparatus, comprising the photographing lens system of claim 1 and an image sensor disposed on the image surface of the photographing lens system.

12. An electronic device, comprising at least two imaging apparatuses facing toward a same side, wherein the at least two imaging apparatuses comprise:
- a first imaging apparatus comprising the photographing lens system of claim 1 and a first image sensor; and
- a second imaging apparatus comprising an optical lens assembly and a second imager sensor;
- wherein the fields of view of the at least two imaging apparatuses differ by at least 20 degrees.

* * * * *